(12) United States Patent
Ito et al.

(10) Patent No.: US 7,891,564 B2
(45) Date of Patent: Feb. 22, 2011

(54) LABEL CREATING SYSTEM, TERMINAL DEVICE AND COMPUTER PROGRAM PRODUCT

(75) Inventors: Chitoshi Ito, Kasugai (JP); Kazuhiko Iwanaga, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 308 days.

(21) Appl. No.: 11/788,253

(22) Filed: Apr. 19, 2007

(65) Prior Publication Data

US 2007/0262141 A1  Nov. 15, 2007

(30) Foreign Application Priority Data

Apr. 25, 2006  (JP)  .............................. 2006-120614
Jul. 25, 2006  (JP)  .............................. 2006-201802

(51) Int. Cl.
G06K 15/00 (2006.01)
(52) U.S. Cl. ..................................................... 235/383
(58) Field of Classification Search .................. 235/383
See application file for complete search history.

(56) References Cited

U.S. PATENT DOCUMENTS

| | | | | |
|---|---|---|---|---|
| 4,734,710 A | * | 3/1988 | Sato et al. ................... | 347/171 |
| RE34,521 E | * | 1/1994 | Shimizu et al. ............. | 400/208 |
| 5,401,110 A | * | 3/1995 | Neeley ....................... | 400/621 |
| 6,525,835 B1 | | 2/2003 | Gulati | |
| 2003/0210942 A1 | * | 11/2003 | Petteruti et al. .......... | 400/615.2 |
| 2003/0231328 A1 | * | 12/2003 | Chapin et al. .............. | 358/1.13 |
| 2004/0236789 A1 | | 11/2004 | Uchida et al. | |
| 2004/0263900 A1 | * | 12/2004 | Nguyen et al. ............. | 358/1.15 |
| 2005/0248606 A1 | * | 11/2005 | Hoshiyama et al. ........... | 347/19 |

FOREIGN PATENT DOCUMENTS

| | | |
|---|---|---|
| JP | 63294340 | 12/1988 |
| JP | 8000585 | 1/1996 |
| JP | 9282118 | 10/1997 |
| JP | 2006099338 | 4/2006 |

* cited by examiner

*Primary Examiner*—Daniel A Hess
*Assistant Examiner*—David Tardif
(74) *Attorney, Agent, or Firm*—Day Pitney LLP

(57) ABSTRACT

A roll sheet type stored in an apparatus/medium type table, the roll sheet wound on a roll sheet holder of each of label creating apparatuses, and a medium type selected by the user are compared to each other. If both values are equal, one of the label creating apparatuses which accommodates the roll sheet holder holding the roll sheet of the medium type is set to be the label creating apparatus to which a PC sends a print request. As a result, the label creating apparatus can be automatically selected by the PC on the basis of label data created by the PC.

5 Claims, 17 Drawing Sheets

LABEL CREATING SYSTEM, TERMINAL DEVICE AND COMPUTER PROGRAM PRODUCT

CROSS-REFERENCE TO RELATED APPLICATIONS

This application claims priority from JP 2006-120614 filed Apr. 25, 2006 and JP 2006-201802, filed Jul. 25, 2006, the contents of which are hereby incorporated by reference.

TECHNICAL FIELD

The disclosure relates to a label creating system comprising a terminal device to create label data for label creation and a plurality of label creating apparatuses to create label on the basis of the label data sent from the terminal device, the terminal device composing the label creating system, and a computer program product used in the terminal device. The disclosure, especially relates to the label creating system in which the terminal device automatically select the label creating apparatus used, terminal device and the computer program product.

BACKGROUND

Conventionally, several suggestions have been offered regarding a system in which a computer can automatically select a printer to be used in a system comprising one or more computer(s) and a plurality of printers connected to each other For instance, for a conventional system comprising one or more computer(s) and a plurality of printers connected to each other, there is proposed a printer selection method comprising a discrimination method to discriminate a type of print data outputted from the computer, a setting method to set a correspondence between the type of the print data and the printer to be used, a reference method to refer the correspondence, and a selection method to select the printer corresponding to the type of the print data based on the result of the discrimination and the reference by the methods. (See Japanese patent application laid-open No. H9 (1997)-282118).

Also, classifications depending on the presence/absence of the color data (in monochrome/color) and a size of a cut sheet (A3/A4) are proposed as an embodiment of the print data type.

However, the printer selection method disclosed in the above publication discloses the selection of the printer provided with the cut sheet of the sheet size matching the print data, but does not describe the case where the printing medium is a tape. Herein, the tape as the printing medium generally has various types provided with a plurality of types of cartridges depending on the tape type. The printer using the tape as the printing medium performs printing in a state where the cartridge is mounted therein. The system in which the printer is selected from among a plurality of printers in accordance with the tape type has been unknown.

SUMMARY

The disclosure has been made in view of the above circumstances and has an object to overcome the above problems and to provide a label creating system in which a terminal device and a plurality of printers are connected to each other, the label creating system using a tape as a printing medium and selecting the printer from among the printers according to the tape type, the terminal device composing the label creating system, and a computer program product used in the terminal device.

To achieve the purpose of the disclosure, there is provided a label creating system comprising: a terminal device; and a plurality of label creating apparatuses that can be connected to the terminal device and can removably accommodate a cartridge holding a tape-typed printing medium, wherein the terminal device comprises: a storage device that stores a label data creating/editing program; a label data creating apparatus that creates label data in accordance with execution of the label data creating/editing program; a date requesting device that can request data on a medium type of the printing medium to each of the label creating apparatuses to be connected when the label data creating/editing program starts; a first receiving device that can receive the data on the medium type sent from each of the label creating apparatuses in response to the request from the date requesting device, a determination device that can determine one of the label creating apparatuses to which the label data can be sent on the basis of the data on the medium type received from the first receiving device; and a first sending device that can send the label data to one of the label creating apparatuses which is determined by the determination device, and each of the label creating apparatuses comprises: a discrimination sensor that can discriminate the medium type of the printing medium to be held in the cartridge; a second sending device that can send the data on the medium type discriminated by the discrimination sensor in response to the request from the terminal device; a second receiving device that can receive the label data sent from the terminal device; and a label printing apparatus that prints on the printing medium on the basis of the label data received by the second receiving device.

The label creating system as configured as above comprises a terminal device; and a plurality of label creating apparatuses that can be connected to the terminal device and can removably accommodate a cartridge holding a tape-typed printing medium, wherein the terminal device comprises: a storage device that stores a label data creating/editing program; a label data creating apparatus that creates label data in accordance with execution of the label data creating/editing program; a date requesting device that can request data on a medium type of the printing medium to each of the label creating apparatuses to be connected when the label data creating/editing program starts; a first receiving device that can receive the data on the medium type sent from each of the label creating apparatuses in response to the request from the date requesting device, a determination device that can determine one of the label creating apparatuses to which the label data can be sent on the basis of the data on the medium type received from the first receiving device; and a first sending device that can send the label data to one of the label creating apparatuses which is determined by the determination device, and each of the label creating apparatuses comprises: a discrimination sensor that can discriminate the medium type of the printing medium to be held in the cartridge; a second sending device that can send the data on the medium type discriminated by the discrimination sensor in response to the request from the terminal device; a second receiving device that can receive the label data sent from the terminal device; and a label printing apparatus that prints on the printing medium on the basis of the label data received by the second receiving device.

Accordingly, the terminal device can determine one of the label creating apparatuses corresponding to the label data on the basis of the data on the medium type obtained by the label creating apparatus before creating the label data, and can instruct the label creating apparatus to produce the label.

According to another aspect of the disclosure, there is provided a terminal device to which a plurality of label creating apparatuses that removably accommodates a cartridge holding a tape-typed printing medium can be connected, comprising: a storage device that stores a label data creating/editing program; a label data creating apparatus that creates label data in accordance with execution of the label data creating/editing program; a date requesting device that can request data on a medium type of the printing medium to each of the label creating apparatuses to be connected when the label data creating/editing program starts; a receiving device that can receive the data on the medium type sent from each of the label creating apparatuses in response to the request from the date requesting device, a determination device that can determine one of the label creating apparatuses to which the label data can be sent on the basis of the data on the medium type received from the receiving device.

According to another aspect of the disclosure, there is provided a computer program product used and executed by a terminal device to which a plurality of label creating apparatuses that removably accommodates a cartridge holding a tape-typed printing medium can be connected, comprising: a recording medium readable by the terminal device; a computer program product stored in the recording medium readable by the terminal device, the computer program comprising steps of: a label data creating step of creating label data in accordance with execution of a label data creating/editing program; a data requesting step of requesting data on a medium type of the printing medium to each of the label creating apparatuses to be connected when the label data creating/editing program starts; a receiving step of receiving the data on the medium type sent from each of the label creating apparatuses in response to the request, a determination step of determining one of the label creating apparatuses to which the label data can be sent on the basis of the received data on the medium type; and a sending step of sending the label data to the determined label creating apparatus.

DETAILED DESCRIPTION

A detailed description of an exemplary embodiment of a label creating system 50 of the disclosure will now be given referring to the accompanying drawings.

Figure 1:
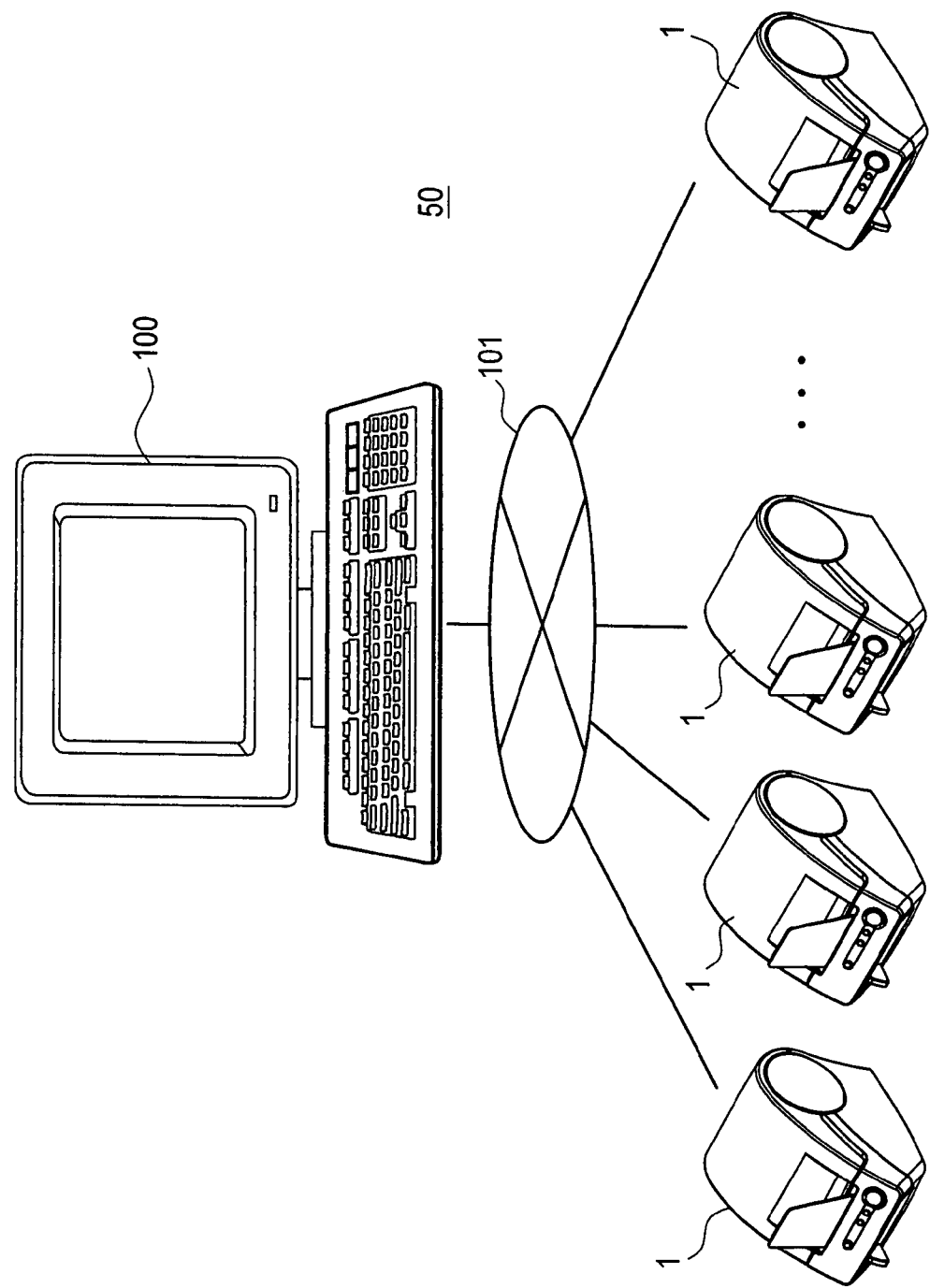
FIG. 1 is a schematic view of a label creating system 50 of this exemplary embodiment.

FIG. 1 is a schematic view of the label creating system 50 of this exemplary embodiment.

As shown in FIG. 1, the label creating system 50 of this exemplary embodiment comprises a plurality of label creating apparatuses 1 and a personal computer (hereinafter, referred to as a PC) 100 as a terminal device, which are connected to a network 101.

Figure 2:
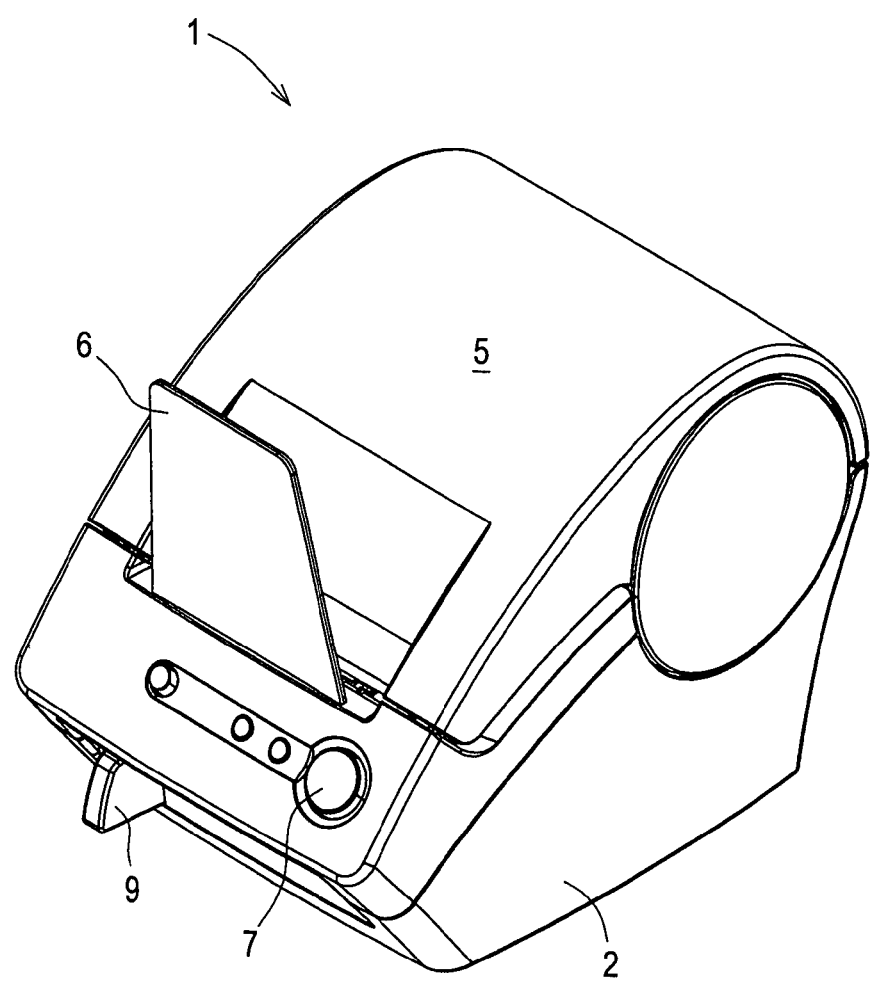
FIG. 2 is a schematic perspective view of a label creating apparatus 1.
Figure 3:
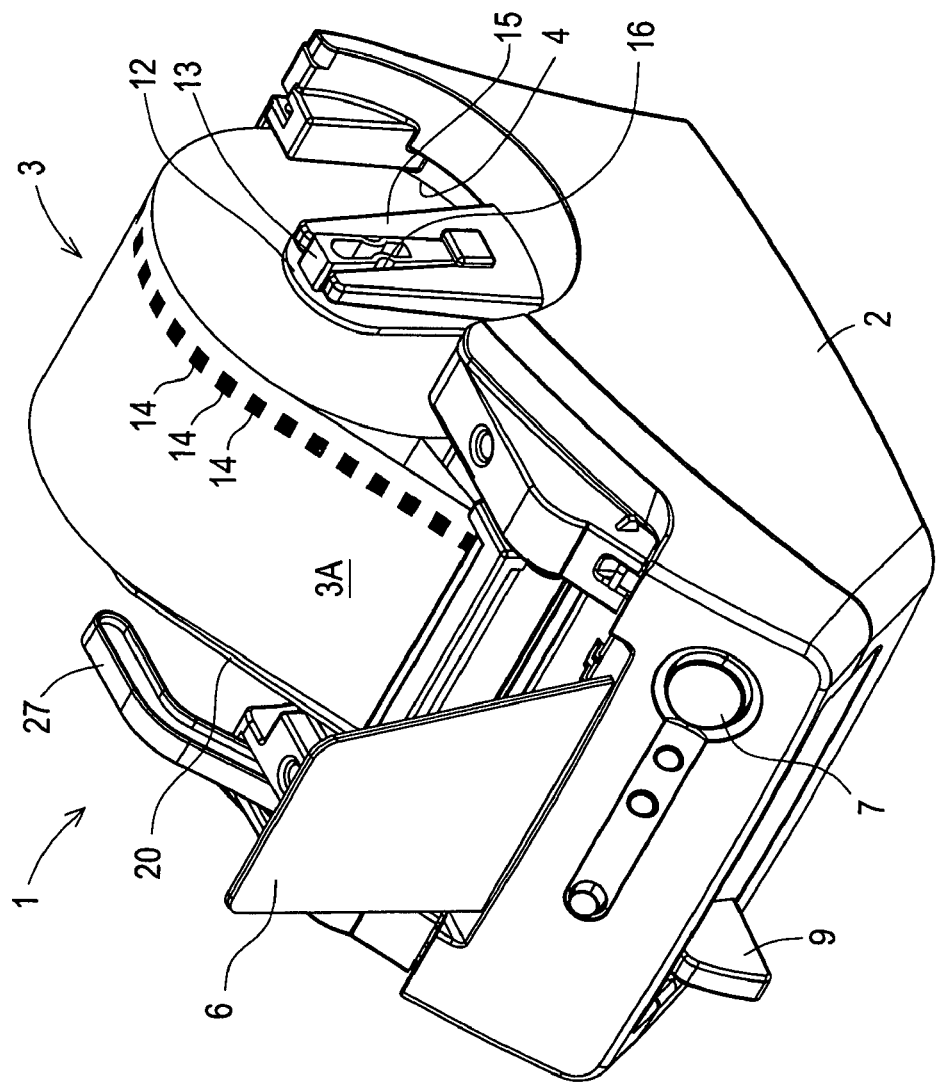
FIG. 3 is a perspective view of the label creating apparatus 1 from which a top cover 5 is removed and in which a roll sheet holder 3 holding an unfixed-length roll sheet 3A of the maximum width is mounted.

Next, a schematic structure of the label creating apparatus 1 will be explained with reference to FIGS. 2 to 7. FIG. 2 is a schematic perspective view of the label creating apparatus 1. FIG. 3 is a perspective view of the label creating apparatus 1 from which a top cover 5 is removed and in which a roll sheet holder 3 holding a roll sheet of the maximum width is mounted.

As shown in FIGS. 2 and 3, the label creating apparatus 1 comprises a housing 2 (a main body) and a roll sheet holder storage part 4 (hereinafter, a "holder storage part") which is a space for receiving the roll sheet holder 3 holding a roll sheet of a predetermined width. The top cover 5 made of transparent resin attached to the housing 2 at a rear upper edge, is freely opened and closed, thereby covering an upper part of the holder storage part 4. The label creating apparatus 1 further comprises a tray 6 made of transparent resin disposed in a standing position to face to a substantially front center of the top cover 5, a power button 7 placed in front of the tray 6, and a cut lever 9 which is slidably provided on a front side of the label creating apparatus 1 to move a cutter unit 8 (see FIG. 6) from side to side, and others. A power cord 10 is connected to the housing 2 on a back face near a corner. The housing 2 is provided on the back face near the other corner with a connector part (not shown) which is connected to for example the network 101.

In FIG. 3, the roll sheet held in the roll sheet holder 3 is an unfixed-length roll sheet 3A. The unfixed-length roll sheet 3A is made of a continuous thermal sheet (so-called thermal paper) having self-coloring property to which a release sheet is adhered on its back side with an adhesive, and the like. The unfixed-length roll sheet 3A is wound on a cylindrically shaped core with a back face outward. On opposite side of a photo sensor 11 as a mark detection sensor described later, a plurality of encoder marks 14 are provided on the back face of the unfixed-length roll sheet 3A with predetermined pitch size (such as 10 mm, 20 mm and 30 mm) in a feeding direction. The width of the encoder marks 14 in the feeding direction is arranged to be a half of the predetermined pitch size.

Figure 4:
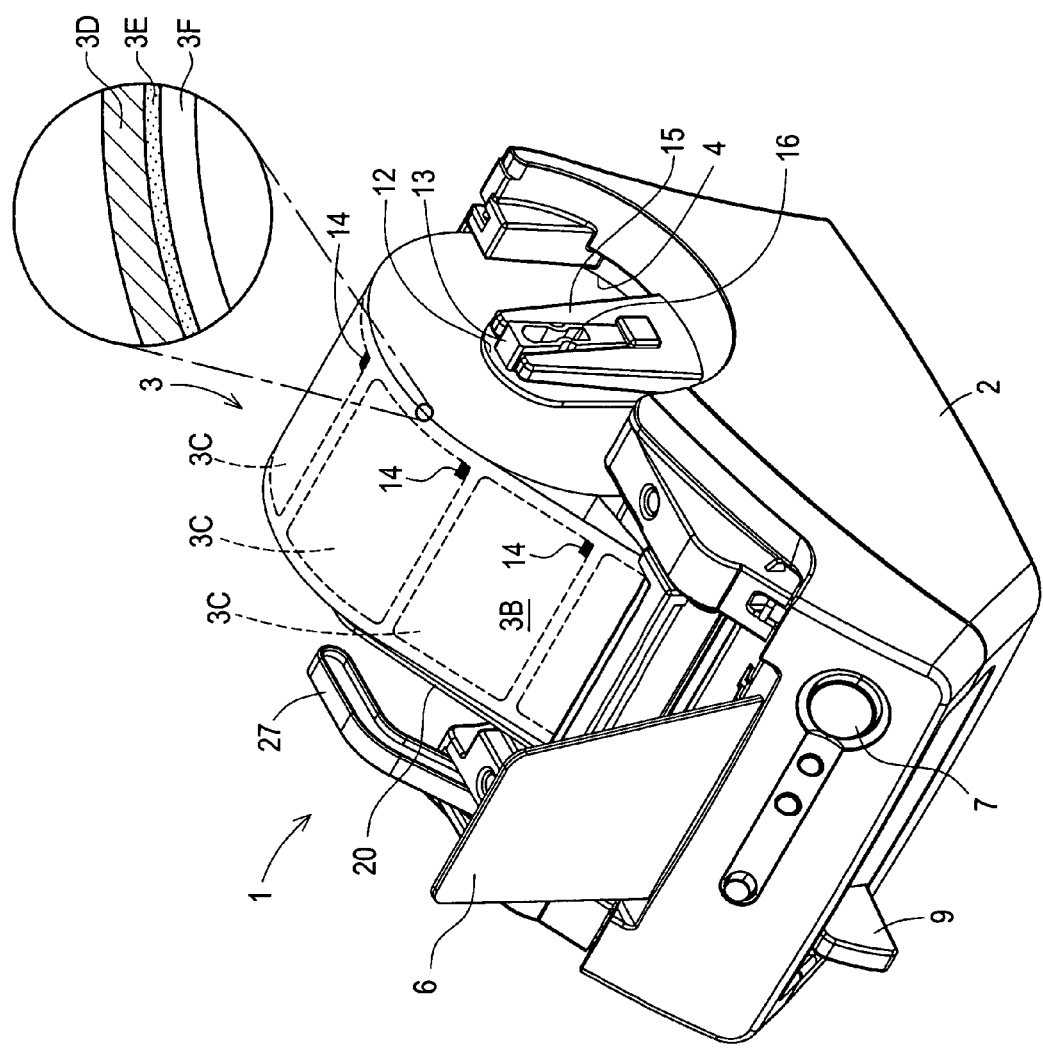
FIG. 4 is a perspective view of the label creating apparatus 1 from which the top cover 5 is removed and in which the roll sheet holder 3 holding a die cut label sheet 3B of the maximum width is mounted.
Figure 5A:
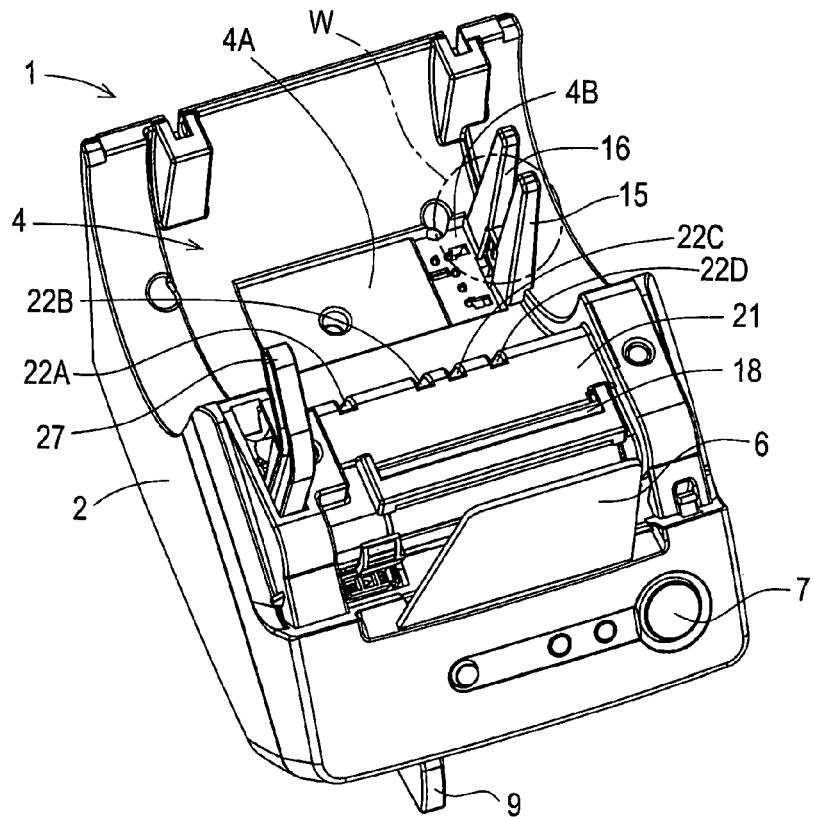
FIG. 5A is a schematic perspective view of the label creating apparatus 1 from which the top cover 5 is removed.
Figure 5B:
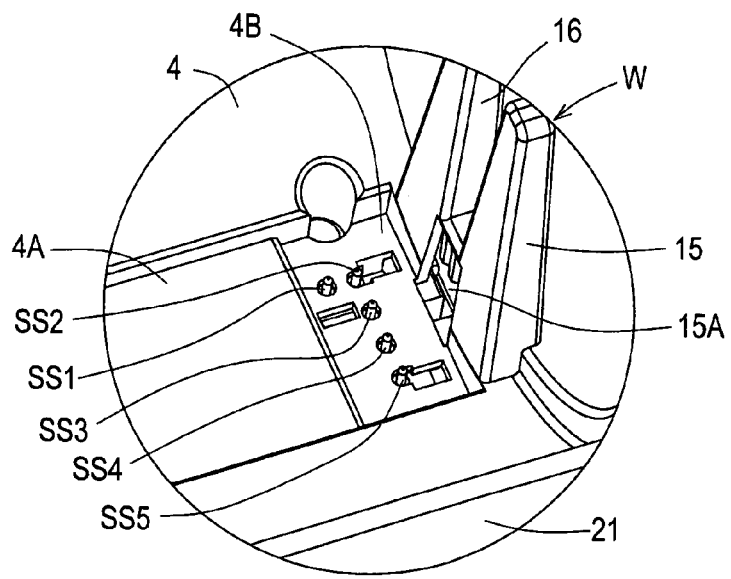
FIG. 5B is an enlarged perspective view of a W part circled by a dashed-dotted line in FIG. 5A.

In FIG. 4, the roll sheet held in the roll sheet holder 3 is a die cut label sheet 3B.

The die cut label sheet 3B is made of a print base sheet 3D made of a thermal sheet (so-called "thermal paper") having a self color development property, an adhesive layer 3E on one side of the print base sheet 3D and a release sheet 3F adhered to the adhesive layer 3E. Further, die cut labels 3C are formed with half cuts which are provided to form predetermined shapes on the die cut label sheet 3B and cut only the print base sheet 3D of the die cut label sheet 3B.

Each die cut label sheet 3C is provisionally adhered to the release sheet 3F by the adhesive layer 3E and arranged along a longitudinal direction of the release sheet 3F. The die cut label sheet 3B is in a wound state around a cylindrical sheet core so that the back surface of the release sheet 3F is outside. On the back surface of the die cut label sheet 3B, an encoder mark 14 is provided in each die cut label 3C at a forward corner in the feeding direction so that each encoder mark 14 comes to a position facing the photo-sensor 11 serving as the mark detection sensor mentioned later.

As shown in FIGS. 3 to 6, the label creating apparatus 1 is provided with a holder support member 15 in the holder storage part 4 at a side end (a right side end in FIG. 5A) in a substantially perpendicular direction to the feeding direction. The holder support member 15 receives a mounting piece 13 of a positioning holding member (hereinafter, a "holding member") 12 constructing the roll sheet holder 3. The mounting piece 13 is provided protruding in a substantially rectangular shape in section on an outer surface of the holding member 12. Specifically, the holder support member 15 provides a first positioning groove 16 shaped like a substantially upright U-shape as seen in side view of the label creating apparatus 1 and opening upward. The holder support member 15 is also formed with a recess 15A at an inner base end thereof. The recess 15A engages with an elastic locking piece 12A (see FIG. 8B) formed projecting at a lower end of the holding member 12.

The housing 2 is formed with an insertion port 18 into which the unfixed-length roll sheet 3A or the die cut label sheet 3B is insertable. A flat portion 21 is formed to be substantially horizontal between a rear end of the port 18 and a front upper edge portion of the holder storage part 4. On this flat portion 21, a front end of a guide member 20 of the roll sheet holder 3 mentioned later is placed. The flat portion 21 is provided at a rear corner in the feeding direction with four second positioning grooves 22A to 22D each formed by a substantially L-shaped wall in section and positioned correspondingly to each of a plurality of the unfixed-length roll sheet 3A or the die cut label sheet 3B of different widths. Each of the second positioning grooves 22A to 22D is configured to fittingly receive a part in contact with the flat portion 21 in the guide member 20 constructing the roll sheet holder 3, inserted from above, as shown in FIG. 3. Further, the front end of the guide member 20 of the roll sheet holder 3 extends to the insertion port 18.

A positioning recess 4A is formed in the bottom of the holder storage part 4. The positioning recess 4A is rectangular in plan view and long sideways in a direction substantially perpendicular to the feeding direction, extending from the inner base end of the holder support member 15 to a position facing the second positioning groove 22A. This positioning recess 4A has a predetermined depth (about 1.5 mm to 3.0 mm in this exemplary embodiment). The width of the positioning recess 4A in the feeding direction is determined to be almost equal to the width of each lower end portion of the holding member 12 and the guide member 20 constructing the roll sheet holder 3. A discrimination recess 4B is provided between the positioning recess 4A and the inner base end of the holder support member 15. This discrimination recess 4B is rectangular in plan view, which is long in the feeding direction, and has a depth larger by a predetermined amount (about 1.5 mm to 3.0 mm in this exemplary embodiment) than the positioning recess 4A. The discrimination recess 4B will receive a roll sheet discrimination part 60 (see FIG. 8B) mentioned later which extends inward from the lower end of the holding member 12 at a right angle therewith.

In the discrimination recess 4B, there are provided five sheet discrimination sensors SS1, SS2, SS3, SS4, and SS5 arranged in an L-shaped pattern for distinguishing the kind of the unfixed-length roll sheet 3A or the die cut label sheet 3B, the material of the thermal sheet, the width of the roll sheet, the pitch size of the encoder mark 14 in the feeding direction and the like. These sensors SS1 to SS5 are each constructed of a well known mechanical switch including a plunger and a push-type microswitch. A top end of each plunger protrudes through the bottom of the discrimination recess 4B to approximately the bottom of the positioning recess 4A. It is detected whether the roll sheet discrimination part 60 has sensor holes 60A to 60E (see FIG. 8), mentioned later, at the positions corresponding to the sheet discrimination sensors SS1 to SS5 respectively. Based on an ON/OFF signal of each sensor SS1 to SS5, the kind of the unfixed-length roll sheet 3A or the die cut label sheet 3B set in the roll sheet holder 3, the material of the thermal sheet, the width of the roll sheet, the pitch size of the encoder mark 14 in the feeding direction and the like are detected.

In each of the sheet discrimination sensor SS1 to SS5 of this exemplary embodiment, the plunger usually protrudes through the bottom of the discrimination recess 4B to approximately the bottom of the positioning recess 4A. At this time, each microswitch is in an OFF state. In the case where the roll sheet discrimination part 60 has some sensor hole(s) 60A to 60E at the positions facing the sheet discrimination sensors S1 to S5, the plunger(s) of the sensor(s) for which the roll sheet discrimination part 60 has sensor hole(s) 60A to 60E is allowed to pass through the associated sensor hole(s) 60A to 60E without depression, leaving the corresponding microswitch(es) in the OFF state, which generates an OFF signal. On the other hand, the plunger(s) of the sensor(s) for which the roll sheet discrimination part 60 has no sensor hole(s) is depressed, bringing the corresponding microswitch(es) into the ON state, which generates an ON signal. Accordingly, the sheet discrimination sensors SS1 to SS5 output five-bit signals including a signal "0" and signal "1". For instance, when all of the sheet discrimination sensors are the OFF state, that is, nothing is set in the roll sheet holder 3, five-bit signals "00000" are output.

The insertion port 18 is arranged so that its one side end (a right end in FIG. 5A) on the holder support member 15 side is substantially flush with the inner surface of the holding member 12 when engaged in the holder support member 15. A guide rib is formed at the side end of the insertion port 18 on the holder support member 15 side.

A lever 27 for operating a vertical movement of a thermal head 31 (see FIG. 6) is provided in front of the other side end (a left side end in FIG. 5A) of the holder storage part 4 in the feeding direction. When the lever 27 is turned up, the thermal head 31 is turned down, separating a platen roller 26 (see FIG. 6). On the other hand, when the lever 27 is turned down, the thermal head 31 is turned up, causing the platen roller 26 to press the part of the unfixed-length roll sheet 3A or the die cut label sheet 3B. Thus, the label creating apparatus 1 is placed in a printing enabled state. Further, a control board 32 (see FIG. 6) formed with a control circuit 61 (see FIG. 9) is provided below the holder storage part 4. This control circuit 61 drives and controls each mechanism in response to commands from an external personal computer and others.

As mentioned above, the mounting piece 13 of the holding member 12 is fit in the first positioning groove 16 of the holder support member 15. The elastic locking piece 12A formed projecting at the lower end of the holding member 12 is engaged in the recess 15A formed at the inner base end of the holder support member 15. Each of the second positioning grooves 22A to 22D receives a face under the front end of the guide member 20 so that the lower end of the guide member 20 is inserted in the positioning recess 4A to be brought into contact therewith. Thus, the roll sheet holder 3 holding the unfixed-length roll sheet 3A or the die cut label sheet 3B wound on the cylindrical core is mounted in the holder storage part 4 to be freely removable therefrom. Simultaneously, the roll sheet discrimination part 60 extending inward from the lower end of the holding member 12 is fitted in the discrimination recess 4B, thereby it can be detected whether the roll sheet discrimination part 60 has the sensor holes 60A to 60E at the positions facing the sheet discrimination sensors SS1 to SS5 respectively. Therefore, the kind of the unfixed-length roll sheet 3A or the die cut label sheet 3B set in the roll sheet holder 3 and the like can be detected.

While the lever 27 is in an up position, one side edge of the unfixed-length roll sheet 3A or the die cut label sheet 3B is guided in contact with the inner surface of the guide member 20 and the other side edge is guided in contact with the protruding guide rib provided at the side end of the insertion port 18. Thereafter, the lever 27 is turned down, and the printer is placed in the printing enabled state.

Figure 6:
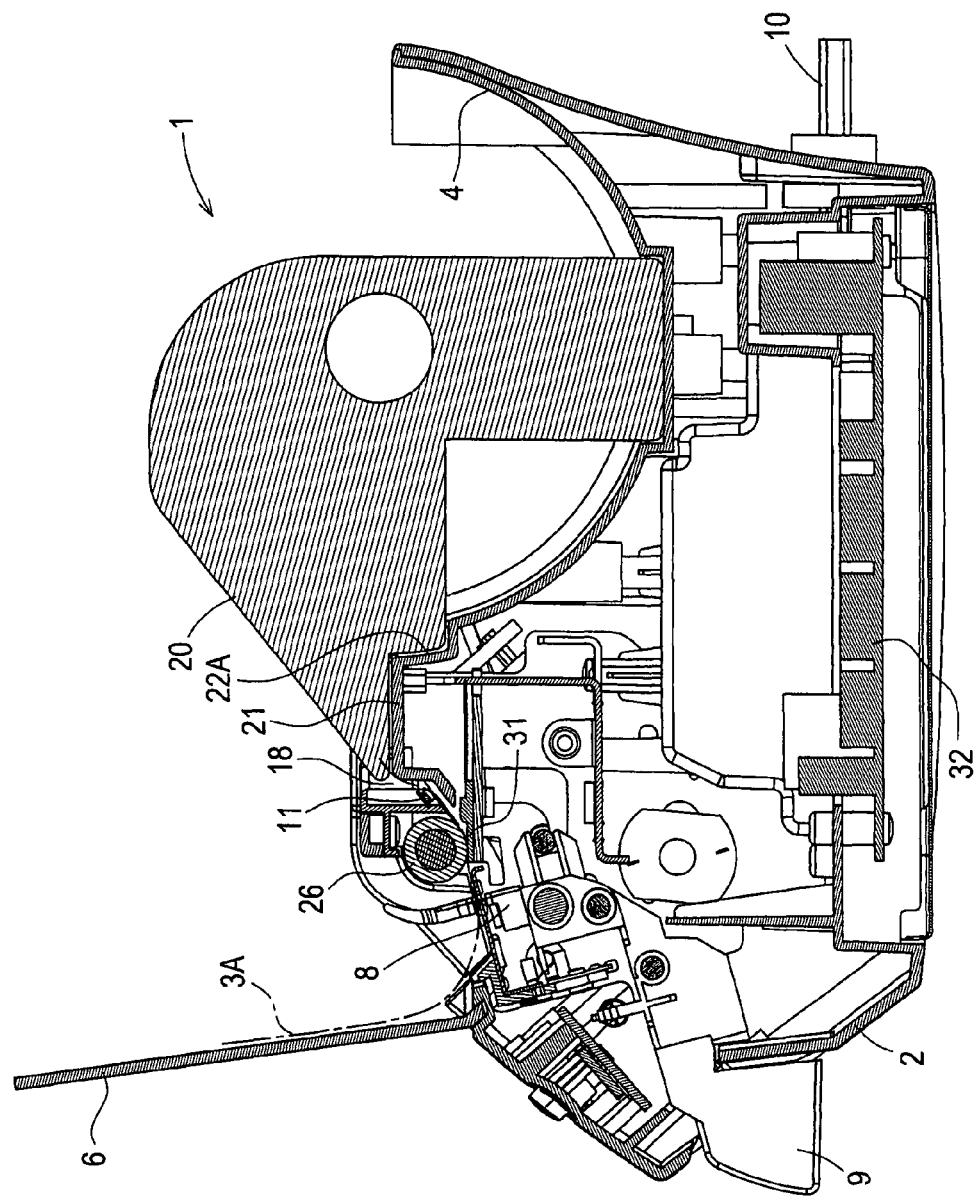
FIG. 6 is a sectional view of the label creating apparatus 1 from which the top cover 5 is removed and in which the roll sheet holder 3 is mounted.
Figure 7:
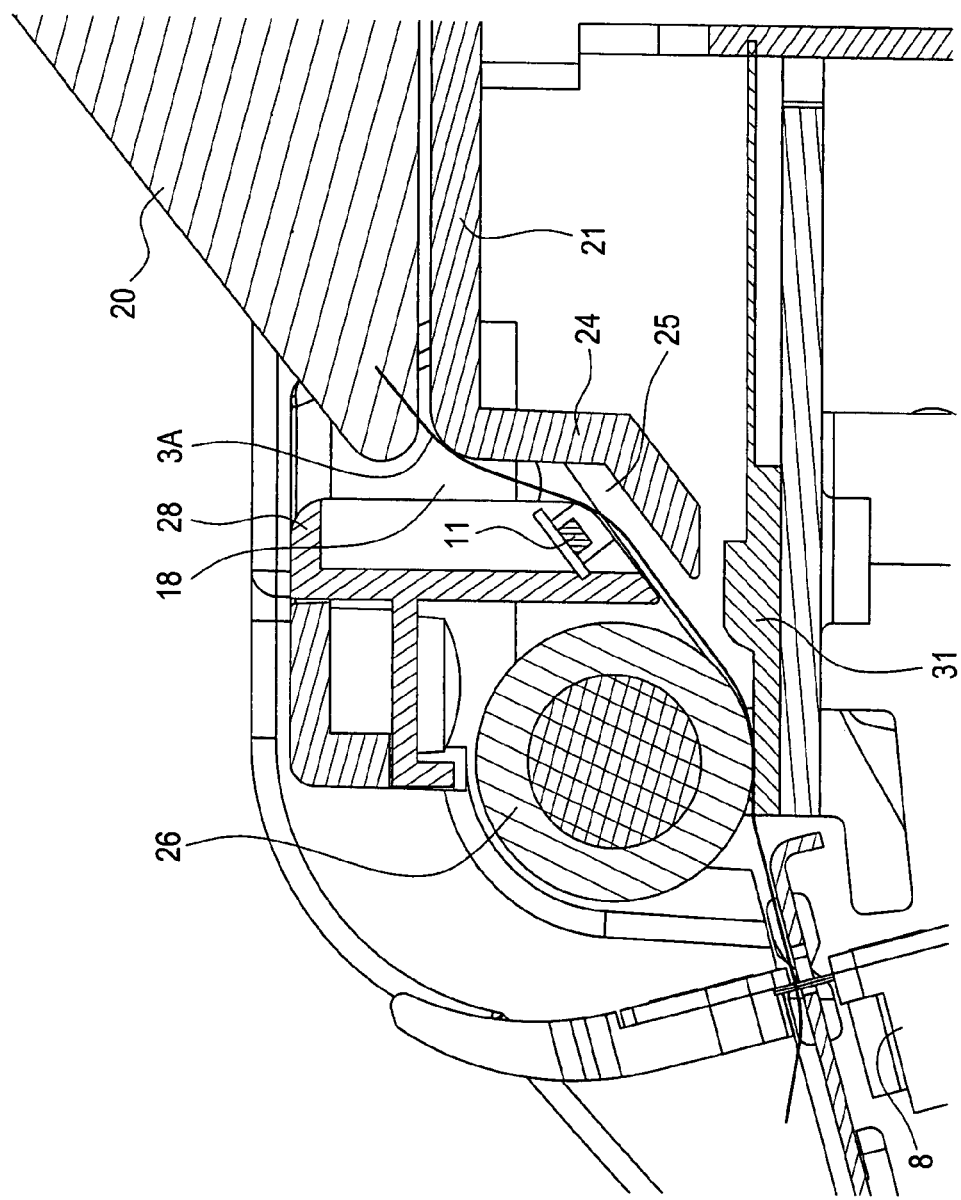
FIG. 7 is an enlarged sectional partial view of positions of a platen roller 26 and a mark detection sensor provided upstream from the platen roller 26 in FIG. 6.

As shown in FIGS. 6 and 7, the lever 27 is turned down, causing the line thermal head 31 to press the unfixed-length roll sheet 3A or the die cut label sheet 3B inserted through the insertion port 18 against the platen roller 26. The thermal head 31 is driven and controlled while the platen roller 26 is rotated by a sheet feeding motor 72 (see FIG. 9) constructed of a step motor or the like, so that image data can be printed in sequence on a printing surface of the thermal sheet while the unfixed-length roll sheet 3A or the die cut label sheet 3B is being fed. The printed part of the unfixed-length roll sheet 3A or die cut label sheet 3B discharged onto the tray 6 is cut by a cutter unit 8 when the user moves the cut lever 9 rightward.

As shown in FIG. 7, an extended portion 24 is formed extending downward in a predetermined length from a front end of the flat portion 21 on which the end of the guide member 20 is placed. The extended portion 24 has a bent end of a predetermined length to the platen roller 26 side, providing a mirror-reversed L-shape in side view. Upstream from the platen roller 26, a guide member 28 is provided leaving a predetermined clearance for the upper surface of the bent end of the extended portion 24. This clearance forms the insertion opening 18. Further, the upper surface of the bent end of the extended portion 24 and the lower end surface of the guide member 28 form a sheet guide path 25 for guiding the unfixed-length roll sheet 3A or the die cut label sheet 3B to underneath the platen roller 26. Accordingly, the unfixed-length roll sheet 3A or die cut label sheet 3B having entered the insertion opening 18 is guided along the sheet guide path 25 to underneath the platen roller 26.

In the lower end surface of the guide member 28, with which back surface of the unfixed-length roll sheet 3A or the die cut label sheet 3B is in contact while the unfixed-length roll sheet 3A or the die cut label sheet 3B is unreeled, the photo sensor 11 which is a reflective photo-sensor serving as the mark detection sensor is disposed near a corner on the holder support member 15 side. This photo-sensor 11 detects the presence or the absence of the encoder mark 14 formed on the back surface of the unfixed-length roll sheet 3A or the die cut label sheet 3B.

It is to be noted that the photo-sensor 11 has to be disposed to face the back surface of the unfixed-length roll sheet 3A or the die cut label sheet 3B having a minimum width. With this configuration, the label creating apparatus 1 is adaptable to any kinds of the unfixed-length roll sheet 3A or the die cut label sheet 3B of different widths.

Next, the schematic structure of the roll sheet holder 3 or the die cut label sheet 3B will be explained with reference to FIGS. 8A and 8B. In the same roll sheet holder 3, the unfixed-length roll sheet 3A or the die cut label sheet 3B are mounted to be circumferentially rotatable, having a same configuration. Therefore, in the following description, the case where the unfixed-length roll sheet 3A is mounted in the roll sheet holder 3 is explained.

Figure 8A:
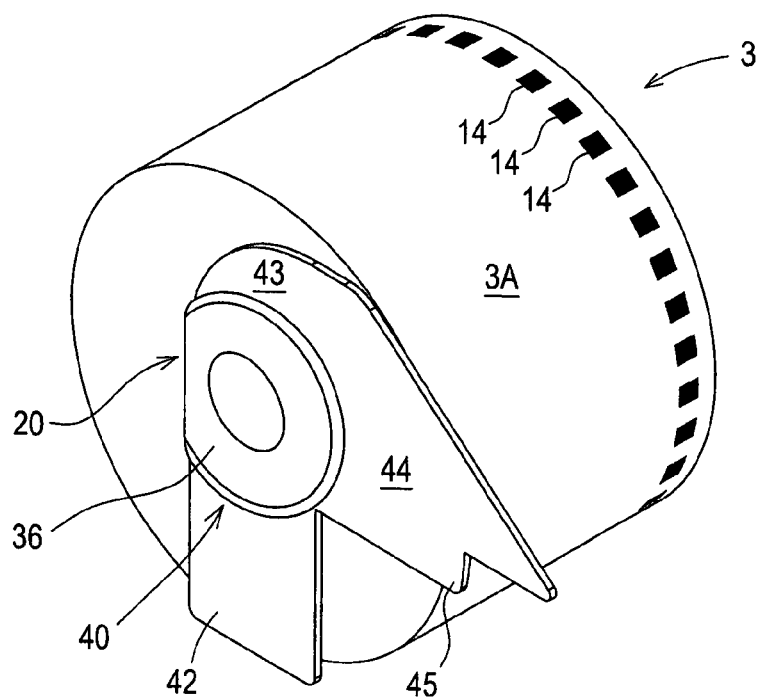
FIG. 8A is a perspective view of the roll sheet holder 3 holding the unfixed-length roll sheet 3A of the label creating apparatus 1, from an upper front side.
Figure 8B:
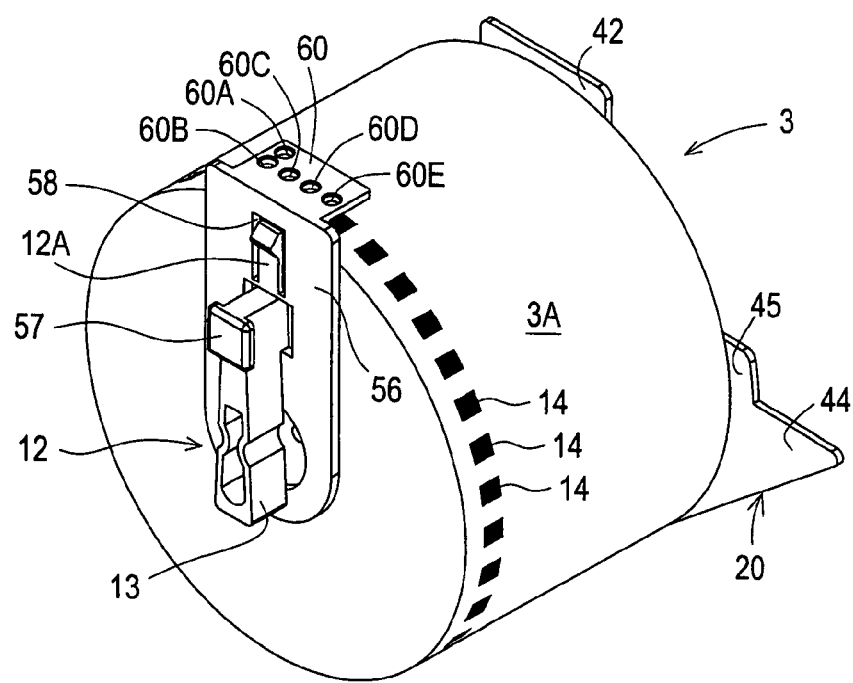
FIG. 8B is a perspective view of the roll sheet holder 3 holding the unfixed-length roll sheet 3A of the label creating apparatus 1, from a lower back side.

As shown in FIGS. 8A and 8B, the roll sheet holder 3 is constructed of the guide member 20, the holding member 12, and a holder shaft 40 of a substantially tube shape. The guide member 20 has a first cylindrical part (not shown) which is fitted at one open end of the sheet core of the unfixed-length roll sheet 3A so that the guide member 20 is held in contact with one of the end faces of the unfixed-length roll sheet 3A. The holding member 12 has a second cylindrical part (not shown) which is fitted in the other open end of the sheet core so that the holding member 12 is held in contact with the other end face of the unfixed-length roll sheet 3A. The holder shaft 40 has two open ends; the one end is fitted in the first cylindrical part of the guide member 20 and formed with a radially extended flange part 36 fixed onto the outer surface of the guide member 20 and the other end is fixedly fitted in the second cylindrical part of the holding member 12. The holder shaft 40 may be selected from among a plurality of shafts of different lengths to easily provide many kinds of roll sheet holders 3 holding the unfixed-length roll sheet 3A and the die cut label sheet 3B of different widths.

The guide member 20 further includes a first, second, third, and fourth extended portions 42, 43, 44, and 45. The first extended portion 42 is formed extending downward in a predetermined length from a lower periphery of an outer end face of the first cylindrical part. This first extended portion 42 is fitted in the positioning recess 4A formed in the bottom of the holder storage part 4 so that the lower end surface of the first extended portion 42 is brought into contact with the bottom surface of the positioning recess 4A. The second extended portion 43 is formed extending upward to cover a front quarter round of the end face of the unfixed-length roll sheet 3A. The third extended portion 44 is formed continuously extending from the second extended portion 43 up to near the insertion opening 18 (see FIG. 3) and has an upper edge sloped downward to the front end. This third extended portion 44 further has a lower edge extending horizontally, which is held in contact with the flat portion 21 of the label creating apparatus 1 so that one side edge of the unwound part of the unfixed-length roll sheet 3A is guided along the inner surfaces of the second and third extended portions 43 and 44 up to the insertion opening 18.

The fourth extended portion 45 is formed under the third extended portion 44 between the rear end of the lower edge at a predetermined distance from the front end and the first extended portion 42. When the lower edge of the third extended portion 44 is held in contact with the flat portion 21, a front edge of the fourth extended portion 45 is inserted in appropriate one of the second placing grooves 22A to 22D corresponding to the sheet width of the unfixed-length roll sheet 3A set in the sheet holder 3 (see FIG. 6).

The first cylindrical part provided on and vertical to the inner surface of the guide member 20 and the second cylindrical part provided on and vertical to the inner surface of the positioning member 12 serve to rotatably support the sheet core on which the unfixed-length roll sheet 3A is wound. The holder shaft 40 may be selected from among a plurality of shafts of different lengths individually corresponding to the lengths of the sheet cores (i.e., the widths of the unfixed-length roll sheets 3A and the die cut label sheet 3B).

The longitudinal mounting piece 13 is provided protruding outward, at substantially the center of the width of the positioning member 12 in the feeding direction (a lateral direction in FIG. 8B), and extending from an end of the holder shaft 40 in a direction vertical to the axis of the holder shaft 40. This mounting piece 13 is of a substantially rectangular section and a width which becomes smaller in a downward direction so that the mounting piece 13 is fitted in the first positioning groove 16 having a narrower width towards the bottom of the holder support member 15 in the label creating apparatus 1. The protruding distance of the mounting piece 13 is determined to be almost equal to the width (in a direction of the width of the label creating apparatus 1, perpendicular to the feeding direction) of the first positioning groove 16.

The mounting piece 13 of the positioning member 12 is provided, on the lower outer surface, with a guide portion 57 of a square flat plate (about 1.5 mm to 3.0 mm in thickness in this exemplary embodiment) having a larger width than the lower portion of the mounting piece 13 by a predetermined amount (about 1.5 mm to 3.0 mm in this exemplary embodiment) on each side of the lower portion. Accordingly, to mount the roll sheet holder 3 in the label creating apparatus 1, the user inserts the mounting piece 13 from above into the first positioning groove 16 by bringing an inner surface of the guide portion 57 into sliding contact with the outer surface of the holder support member 15. Thus, the roll sheet holder 3 can easily be fitted in place.

The positioning member 12 is designed to have the extended portion 56 extending downward longer by a predetermined length (about 1.0 mm to 2.5 mm in this exemplary embodiment) than the lower end (the first extended portion 42) of the guide member 20. The positioning member 12 is also provided, at the lower end of the extended portion 56, with the sheet discrimination part 60 of a substantially rectangular shape extending inward by a predetermined length at almost right angle to the extended portion 56.

As shown in FIG. 8B, as mentioned above, the sheet discrimination part 60 is formed with the sensor holes 60A to 60E arranged at predetermined positions corresponding to the sheet discrimination sensors SS1 to SS5 respectively, in the L-shaped pattern in this exemplary embodiment. In this exemplary embodiment, the number of the sensor holes is five at the maximum. Specifically, the presence and absence of each hole are allocated "1" and "0" respectively so that the kind of roll sheet 3A and the die cut label sheet 3B held in the roll sheet holder 3, the material of the thermal sheet, the width of the roll sheet, the pitch size of the encoder mark 14 in the feeding direction and the like are represented as five bits. It should be noted that the information indicated by the sensor holes 60A to 60E substantially corresponds to the information about the type of the roll sheet (the media type) wound on the roll sheet holder 3. Accordingly, the sensor holes 60A to 60E can be regarded as indicating the information about the roll sheet holder 3 and also about the information about the roll sheet wound on the roll sheet holder 3.

The positioning member 12 is further formed with a longitudinally rectangular through hole 58 in the extended portion 56 under the mounting piece 13. The elastic locking piece 12A is provided extending downward from the upper edge of the through hole 58 and formed with an outward protrusion at a lower end.

The circuit configuration of the label creating apparatus 1 having such structure is explained below by referring to FIG. 9.

Figure 9:
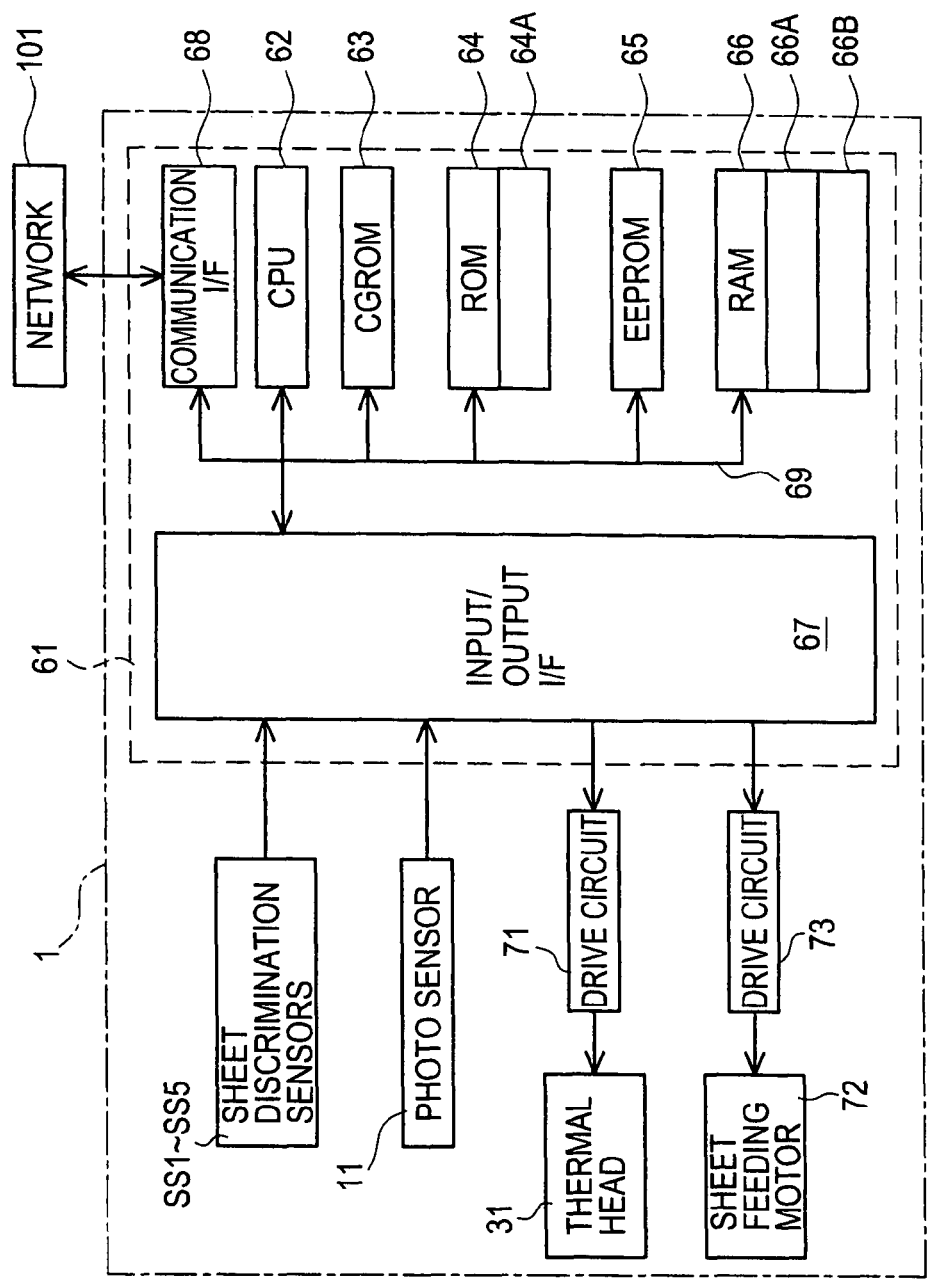
FIG. 9 is a circuit block diagram of main parts of the label creating apparatus 1.

As shown in FIG. 9, the control circuit 61 formed on the control board 32 of the label creating apparatus 1 includes a CPU 62, a CG (character generator) ROM 63, a ROM 64, a flash memory (EEPROM) 65, a RAM 66, an input/output interface (I/F) 67, a communication interface (I/F) 68, and others. Further, the CPU 62, the CGROM 63, the ROM 64, the flash memory 65, the RAM 66, the input/output interface (I/F) 67, and the communication interface (I/F) 68 are mutually connected by means of a bus line 69, so that the data can be exchanged mutually.

In the CG ROM 63, dot pattern data corresponding to each character is stored, and the dot pattern data is read out from the CGROM 63, and the dot pattern is printed on the basis of the dot pattern data on the thermal sheet of the unfixed-length roll sheet 3A or the die cut label sheet 3B.

Further, the ROM 64 stores various programs, that is, various programs necessary for control of the label creating apparatus 1 such as feeding process programs of the unfixed-length roll sheet 3A or the die cut label sheet 3B described below. The ROM 64 also stores the kind of the unfixed-length roll sheet 3A or the die cut label sheet 3B, the material of the thermal sheet, the width of the roll sheet, and the pitch size of the encoder mark 14 in the feeding direction, each of which corresponds to each code of 5 bits entered from the sheet discrimination sensors SS1 to SS5.

For example, in the ROM 64, corresponding to a 5-bit code of "11100" entered from sheet discrimination sensors SS1 to SS5, Kind: "Unfixed-length Roll Sheet 3A", Material of Thermal Sheet: "Material A", Roll Sheet Width: "100 mm", and Pitch Size of the Encoder Mark 14 in the Feeding Direction: "5 mm", are stored. Corresponding to a 5-bit code of "11000", kind: "Unfixed-length Roll Sheet 3A", Material of Thermal Sheet: "Material B", Roll Sheet Width: "100 mm", and Pitch Size of the Encoder Mark 14 in the Feeding Direction: "5 mm", are stored. Corresponding to a 5-bit code of "10110", Kind: "Die Cut Label Sheet 3B", Material of Thermal Sheet: "Material A", Roll Sheet Width: "100 mm", Pitch Size of the Encoder Mark 14 in the Feeding Direction: "5 mm", and type of die cut: "Round 90 mm", are stored. Corresponding to a 5-bit code of "10100", Kind: "Die Cut Label Sheet 3B", Material of Thermal Sheet: "Material B", Roll Sheet Width: "100 mm", Pitch Size of the Encoder Mark 14 in the Feeding Direction: "5 mm", and Type of Die Cut: "Square 90 mm×90 mm", are stored.

In the case of the thermal sheet of the material A, the maximum feeding speed of the thermal sheet that can be printed by way of the thermal head 31 is 80 mm/sec, and the feeding speed of the unfixed-length roll sheet 3A using thermal sheet of the material A is 80 mm/sec, which is preliminarily stored in the ROM 64. In the case of the thermal sheet of the material B, the maximum feeding speed of the thermal sheet that can be printed by way of the thermal head 31 is 20 mm/sec, and the feeding speed of the unfixed-length roll sheet 3A using the thermal sheet of the material B is 20 mm/sec, which is also preliminarily stored in the ROM 64.

The CPU 62 operates various calculations on the basis of the programs stored in the ROM 64. The ROM 64 stores the outline data specifying the outline of each character classified in type style (Gothic, Mincho font, etc.) corresponding to the code data, in each character of multiple types of characters. According to the outline data, the dot pattern data is developed on a print buffer 66A.

The flash memory 65 stores the dot pattern data such as optional font data received from outside computer or other device or the dot pattern data such as various pattern data, together with registration numbers, and the contents of storage are supported if the power source of the label creating apparatus 1 is turned off.

The RAM 66 is a temporary storage of various operation results calculated by the CPU 62, and various memories are provided such as print buffer 66A, work area 66B and the like. The print buffer 66A stores dot patterns for printing such a plural characters and symbols as the dot pattern data, and number of applied pulses as the forming energy quantity of each dot, and the thermal head 31 prints dots according to the dot pattern data stored in the print buffer 66A.

The input/output I/F 67 connects the sheet discrimination sensors SS1 to SS5, the photo-sensor 11, and a drive circuit 71 for driving the thermal head 31, and a drive circuit 73 for driving the sheet feeding motor 72 to drive and rotate the platen roller 26.

The communication I/F 68 is connected to the network 101 by means of network cable, so that two-way data communication is realized.

In the label creating apparatus configured as above, the CPU 62 keeps monitoring whether various kinds of requests are received by means of the communication I/F 68 or not. It is noted that the request is command data to the label creating apparatus 1, which is sent by means of the communication I/F 68.

When the CPU 62 receives a sheet type request from the PC 100 by means of the communication I/F 68 via the network 101, the CPU 62 instructs the sheet discrimination sensors SS1 to SS5 to read out the value. The CPU 62 obtains data about the mounted roll sheet holder 3 by the value read by the sheet discrimination sensors SS1 to SS5, referring to the data stored in a roll sheet type storage area 64A. The CPU 62 sends the data about the mounted roll sheet holder 3 back to the PC 100 which sent the sheet type request by means of the communication I/F 68 via the network 101. This process is continuously executed while the label creating apparatus 1 is ON, because the PC 100 sends the sheet type request to the label creating apparatus 1 in a predetermined cycle while a label creating application (mentioned later) is running, so that in each cycle the label creating apparatus 1 also executes the read operation of the sheet discrimination sensors SS1 to SS5 and the send-back operation of the data about the mounted roll sheet holder 3. Thus, while the label creating application (mentioned later) is running in the PC 100, the label creating apparatus 1 which has received the sheet type request executes the read operation of the sheet discrimination sensors SS1 to SS5 even when the label creating apparatus 1 has been just turned on and started up.

When the CPU62 receives a print request mentioned later from the PC 100 by means of the communication I/F 68 via the network 101, the CPU 62 instructs the sheet discrimination sensors SS1 to SS5 to read out the value. The CPU 62 obtains data about the mounted roll sheet holder 3 by the value read by the sheet discrimination sensors SS1 to SS5, referring to the data stored in the roll sheet type storage area 64A. If the CPU 62 determines that creating a label on the basis of the label data composing the print request from the roll sheet wound on the mounted roll sheet holder 3 is impossible, the CPU 62 sends an error back to the PC100 which sent the print request by means of the communication I/F 68 via the network 101. Accordingly, the process for the print request is terminated.

On the other hand, if the CPU 62 determines that creating the label is possible, the CPU 62 produces a print image of the label to be created, and develops the print image on the print buffer 66A of the RAM 66. After that, the CPU 62 executes printing on the roll sheet according to the print image developed on the print buffer 66A of the RAM 66, synchronizing the thermal head 31 with the sheet feeding motor 72. It is noted that the user operates the cut lever 9 to cut the roll sheet after printing.

Figure 10:
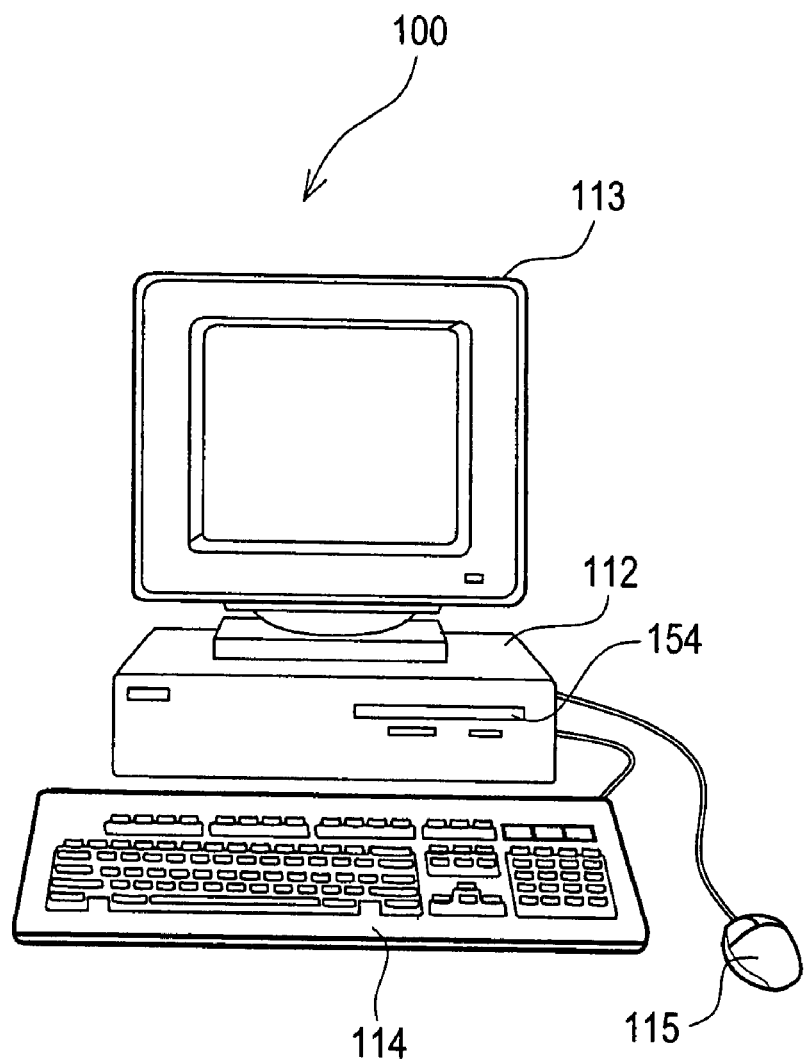
FIG. 10 is a schematic view of a PC 100 of this exemplary embodiment.
Figure 11:
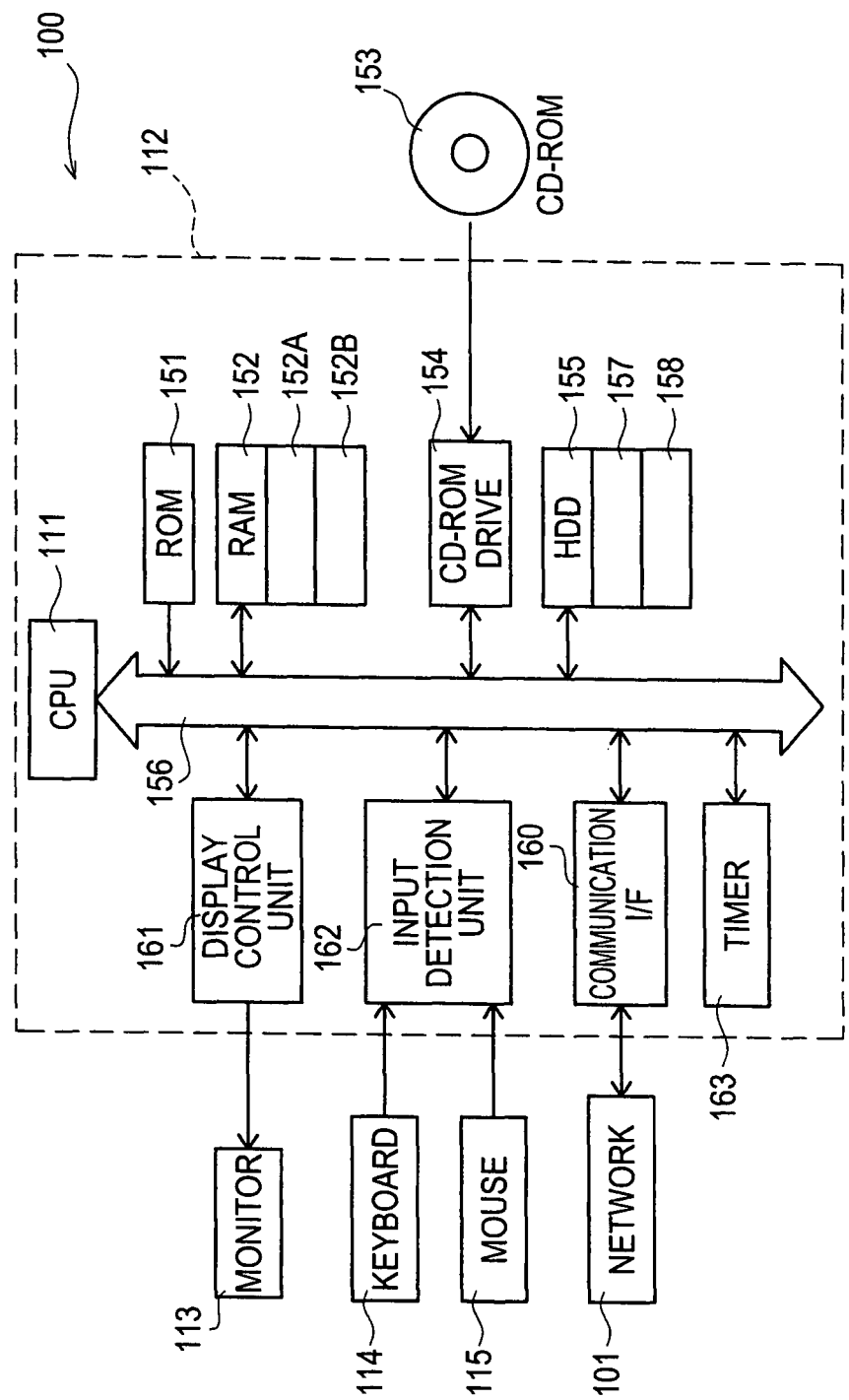
FIG. 11 is a block diagram of an electrical constitution of the PC 100.

Next, a schematic structure of the PC 100 will be explained. FIG. 10 is a schematic perspective view of the PC 100. FIG. 11 is a block diagram showing an electrical structure of the PC 100.

The PC 100 is a well known PC. As shown in FIG. 10, the PC 100 comprises a main unit 112 including a CPU 111 (see FIG. 11), a monitor 113, a keyboard 114 and a mouse 115. Each of the monitor 113, the keyboard 114 and the mouse 115 are connected to the main unit 112 via a connecting cable. The PC 100 is also provided with a connecting port (not shown) to be connected to the network 101 and the like.

Next, the electrical structure of the PC 100 will be explained with reference to FIG. 11. As shown in FIG. 11, the PC 100 is provided with the CPU 111 which controls the PC 100. The CPU 111 is connected to a ROM 151, a RAM 152, a CD-ROM drive 154 and a HDD 155 by means of a bus line 156. The ROM 151 stores programs such as BIOS that the CPU 111 executes. The RAM 152 is a temporary storage of various operation results calculated by the CPU 111. The CD-ROM drive 154 is a drive into which a CD-ROM 153 as a memory medium of the data is to be inserted, to read the data. The HDD 155 is a storage device of the data.

In the RAM 152, various memories are provided such as apparatus/medium type table storage area 152A, work area 152B and the like.

The HDD 155 includes a label creating program storage area 157, a program-related data storage area 158 and others. The label creating program storage area 157 stores a label creating program providing a label creating feature to create the label data which becomes a basis of the label. The program-related data storage area 158 stores information about a setting, default values, data and the like, which are necessary for the execution of the program. The program-related data storage area 158 also has information about types of the roll sheets, types of templates mentioned later, and specifications of barcodes.

Further, to the CPU 111, a communication I/F 160, a display control unit 161, an input detection unit 162, the keyboard 114 and the mouse 115 are connected by means of the bus line 156. The communication I/F 160 communicates with external devices including the label creating apparatus 1 via the network 101. The display control unit 161 displays an operation screen on the monitor 113 for the user. The keyboard 114 and the mouse 115 are used by the user to input operations. It is noted that the PC 100 can be provided with a flexible disc drive, an input/output part of audio sounds and the like, various kinds of interfaces, and others, which are not shown.

The CD-ROM 153 includes the label creating program, and the settings and the data to be used when the program executes, which are copied to the label creating program storage area 157 and the program-related data storage area 158 in the HDD 155 from the CD-ROM 153 at the time of installation. The PC 100 can obtain the label creating program and the data to be used not only from the CD-ROM 153, but also other storage mediums such as a flexible disc and a MO, and another terminal device in the network 101.

Further, a timer 163 is connected to the CPU 111 by means of the bus line 156. As described above, the PC 100 sends the sheet type request to the label creating apparatus 1 by means of the communication I/F 68 via the network 101. The timer 163 is used to count a predetermined cycle in which the request is sent. The CPU 111 is arranged to execute a medium type acquisition timer process (see FIG. 17) prior to other processes after each predetermined time that the timer 163 counts has passed (this is a so-called interrupt process). However, the medium type acquisition timer process is set not to be executed on a priority basis during a sending/receiving process to/from the label creating apparatus 1 (for instance, at S14 in FIG. 15) in a label creating process (see FIG. 15) mentioned later, and a label creating apparatus changing process (see FIG. 16). In this exemplary embodiment, the predetermine time is set to be about one minute, but it can be shorter than one minute. Contrarily, the predetermined time can be longer than one minute.

Figure 12:
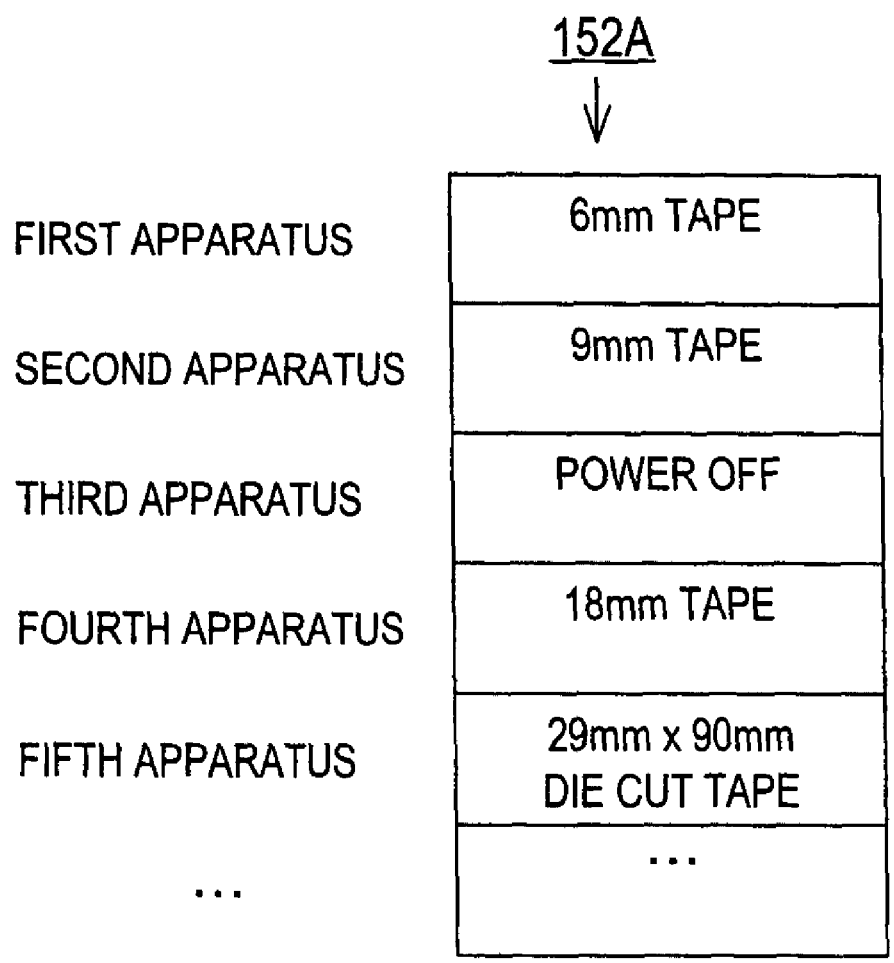
FIG. 12 is a schematic diagram of an apparatus/medium type table storage area 152A.

Next, an apparatus/medium type table stored in the apparatus/medium type table storage area 152A in the RAM 152 will be explained with reference to FIG. 12. FIG. 12 is a schematic diagram of one example of the apparatus/medium type table.

As shown in FIG. 12, in the apparatus/medium type table storage area 152A, a storage area is allocated to each one of all the label creating apparatuses 1 connected to the network 101. The storage areas composing the apparatus/medium type table storage area 152A include, from the top of the apparatus/medium type table storage area 152A, a storage area for the first label creating apparatus 1, a storage area for the second label creating apparatus 1, a storage area for the third label creating apparatus 1, and a storage areas for forth, fifth . . . and the followings. Each of the storage areas stores the type of the roll sheet holder 3 set in the label creating apparatus 1. It is noted that the type of the roll sheet holder 3 is allocated in accordance with the roll sheet type wound on the roll sheet holder 3, they are practically the same. Hereinafter, the value stored in the storage areas composing the apparatus/medium type table storage area 152A indicates both of these types.

The example in FIG. 12 shows that the roll sheet holder 3 holding the unfixed-length roll sheet 3A of 6 mm is set in the first label creating apparatus 1; the roll sheet holder 3 holding the unfixed-length roll sheet 3A of 9 mm is set in the second label creating apparatus 1; the third label creating apparatus 1 is turned off; the roll sheet holder 3 holding the unfixed-length roll sheet 3A of 18 mm is set in the fourth label creating apparatus 1; and the roll sheet holder 3 holding the die cut label sheet 3B on which the die cut labels 3C of 29 mm×90 mm are formed with half cuts.

Figure 13:
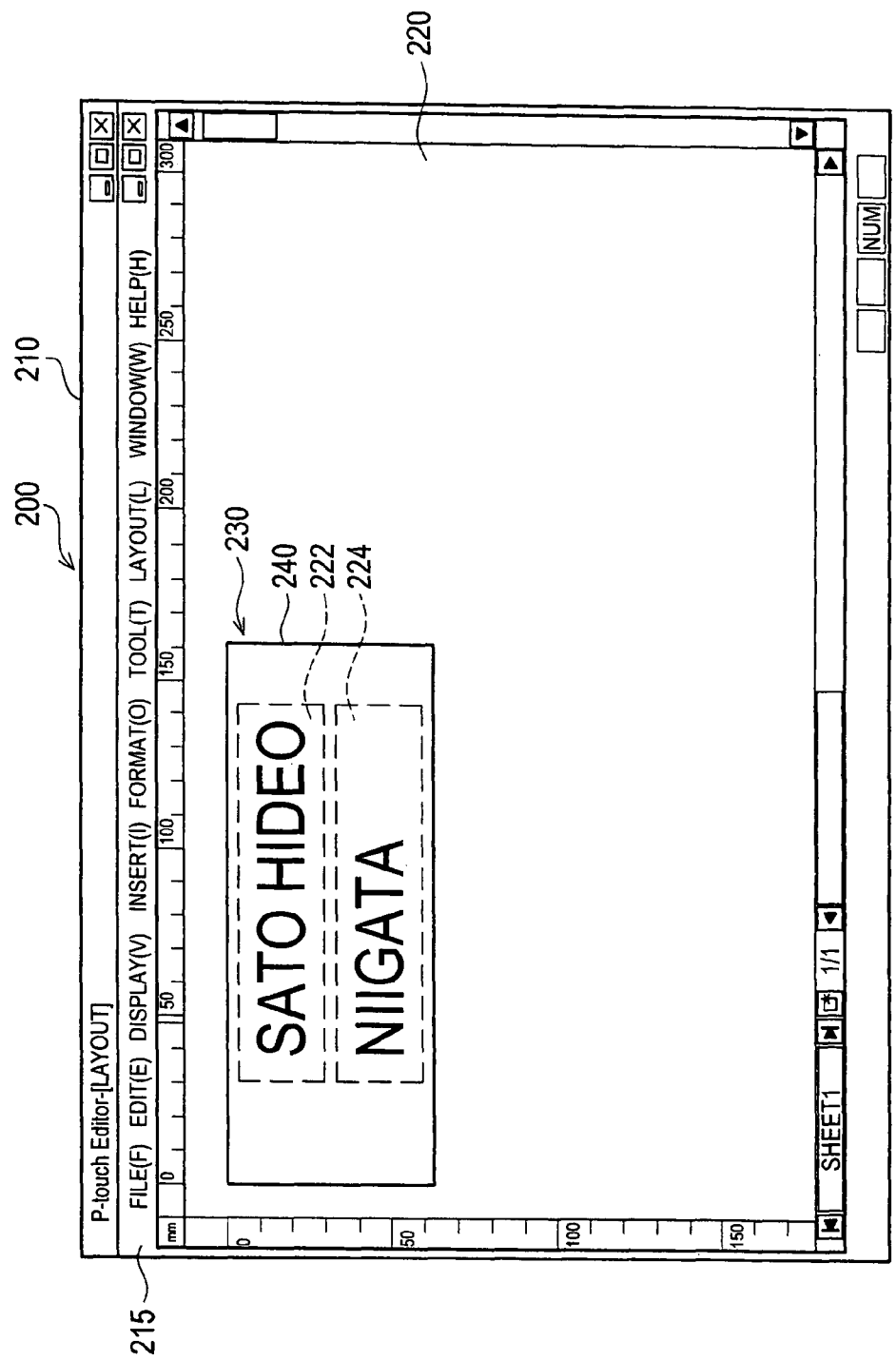
FIG. 13 is an image view of an edit screen 210 of a label creating application 200.

Next, the label creating application which starts by the execution of the label creating program on the PC 100 will be explained with reference to FIG. 13. FIG. 13 is an image view of an edit screen of the label creating application.

A label creating application 200 is displayed on the monitor 113 of the PC 100. Inputs and commands are entered with the keyboard 114 and the mouse 115.

As shown in FIG. 13, in the top of the edit screen 210 of the label creating application 200, a menu bar 215 is provided for operator's instruction. The menu bar 215 includes a file menu, an edit menu, a display menu, an insert menu, a format menu, a tool menu, a layout menu, a window menu and a help menu. Under the menu bar 215 in the edit screen 210, there is provided an edit area 220 where characters and the like to be printed in the label creating apparatus 1 are edited. In the edit area 220, a label image 230 in which a text boxes 222, 224 as objects to be printed are laid out. In the label image 230, a label frame 240 which indicates an outline of the label to be created is displayed, and the text boxes 222, 224 are laid out therein. It is noted that "Sato Hideo" is inputted in the text box 222, and "Niigata" is in the text box 224.

Each menu in the menu bar 215 has sub-menus. For instance, the file menu has a new file menu to create a new label image 230, a save menu to save the label data corresponding to the label image 230 in a label file which is a file storing the label data, a file open menu to display the label image 230 as an object of editing after the user selects the label file from existing files, print menu to send the label data corresponding to the label image 230 to the label creating apparatus 1 to instruct the label creating apparatus 1 to perform the label printing, a medium type select menu to guide the user to select the roll sheet from which the label is created, an end menu to end the label creating application 200, and others. The layout menu has a template select menu to guide the user to select a template which is a model of the layout to create the label image 230, and the like. The insert menu has a barcode menu to guide the user to select a barcode format to lay out the barcode as an object in the label image 230, and to input the barcode data to be indicated by the barcode, and the like. The edit menu has a character input menu to switch to a character input mode for inputting characters in a position indicated by a cursor, an object specify menu to select the object by the cursor, and the like. The format menu has various kinds of menus to decorate the text in the text boxes, and others.

A normal edit process to add the text box to the label image 230 is as follows: when the mode is switched to the character input mode in the character input menu, and a mouse cursor is moved to the edit area 220, a vertical cursor appears with a click. Subsequently, characters are inputted to be added to the position of the vertical-insertion cursor, and a text box is automatically formed so as to surround the characters. When the mouse cursor is moved to the existing text box, a vertical-insertion cursor appears in the pre-inputted text with a click. Next, characters are inputted or deleted, so that the pre-inputted text is updated.

Figure 14:
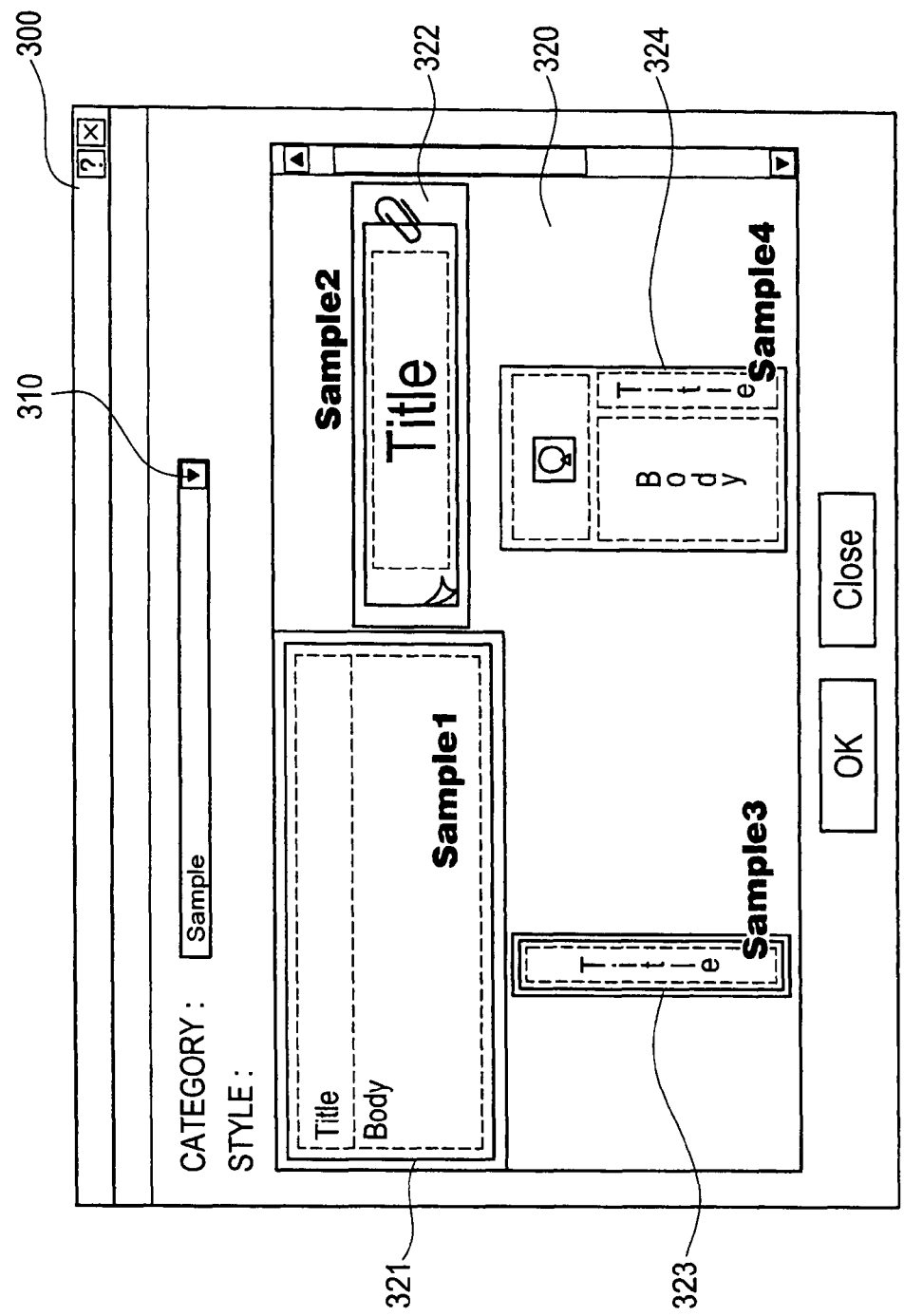
FIG. 14 is an image view of a template select dialogue 300.

Next, a template select dialogue which appears when the above-mentioned template select menu is assigned will be explained with reference to FIG. 14. FIG. 14 is an image view of the template select dialogue.

A template of the layout has specifications about outer size of the label to be created, and types, positions and sizes of various kinds of objects to be arranged within the label.

As shown in FIG. 14, in the top of a template select dialogue 300, there is provided a category select field 310 for the category selection, where the templates are shown by being classified by category. A downward triangle is displayed on the right end of the category select field 310. The user clicks on the downward triangle to select the desired category among the lists of the categories. In the example of FIG. 14, the category "Sample" is selected in the category select field 310.

Under the category select field 310, there is provided a style select field 320, where reduced images of the label of each template are laid out with each template title. As an example, a template 321 titled "Sample1", a template 322 titled "Sample2", a template 323 titled "Sample3", and a template 324 titled "Sample4" are displayed in the style select field 320 of FIG. 14. A box-shaped frame surrounds the template 321, which indicates that the template 321 is currently selected. This frame can be moved to other templates when an up key, a down key, a left key or a right key which are not shown are pressed, and the user clicks the mouse 115. The style select field 320 can show other templates when a scroll bar on the right end of the style select field 320 is moved upward and downward.

The template 321 has a box-shaped outline indicating the landscape-oriented label where a text box showing "Title" in a horizontal orientation and a text box showing "Body" in a horizontal orientation are arranged one above the other. Further, each text box is represented by a broken-lined box (as same as below). The template 322 has a box-shaped outline indicating the landscape-oriented label where there are arranged a frame object reflecting an image of the landscape-oriented label as well with a clip image on the right end thereof and a flipped corner on the lower bottom, and a text box showing "Title" in a horizontal orientation within the frame object.

The template 323 has a box-shaped outline indicating the portrait-oriented label where a frame object which is also portrait-oriented and a text box showing "Title" in a vertical direction within the frame object are arranged. The template 324 has a box-shaped outline indicating the portrait-oriented label where on the top there are provided an illustration arrangement frame represented by a pattern formed by a combination of a circle, a triangle and a square, and a broken-lined box surrounding the pattern. Also within the box-shaped outline indicating the portrait-oriented label, under the illustration arrangement frame, a text box showing "Title" in the vertical direction and a text box showing "Body" in the vertical direction are arranged on the right and left.

After the desired template is selected in the style select field 320, the template selection is accepted with the click of an OK button in the bottom of the template select dialogue 300. The template select dialogue 300 is closed, and then the label image 230 of the layout template selected in the template select dialogue 300 appears in the edit area 220 of the edit screen 210.

When the label image 230 of the layout template has a text box, letters such as "Title" and "Body" shown in the selected text boxes in the template select dialogue 300 are displayed likewise. The frame indicates that it is the text box. This is a dummy display, and will be deleted when characters are actually inputted. If the label is created with no characters inputted in the text box, nothing is printed in the area.

Further, when the label image 230 of the layout template has an illustration arrangement frame, the pattern formed by a combination of the circle, triangle and square shown in the selected illustration arrangement frame of the selected template is displayed likewise. The frame indicates that it is the illustration arrangement frame. The appeared pattern is just a dummy display, and will be deleted when an illustration is actually entered. If the label is created with no illustrations, nothing is printed in the area.

Next, the label file which is created with this label creating application will be explained.

The label data corresponding to the label image 230 being edited is saved in the label file by the save menu provided in the label creating application 200. This label file is a file based on the file system of the OS, so that the label file is stored in an area which is allocated for the label file saving in an unassigned area in the HDD 155 every time the label file is created as well as a case where a general file is saved in the HDD.

Figure 15:
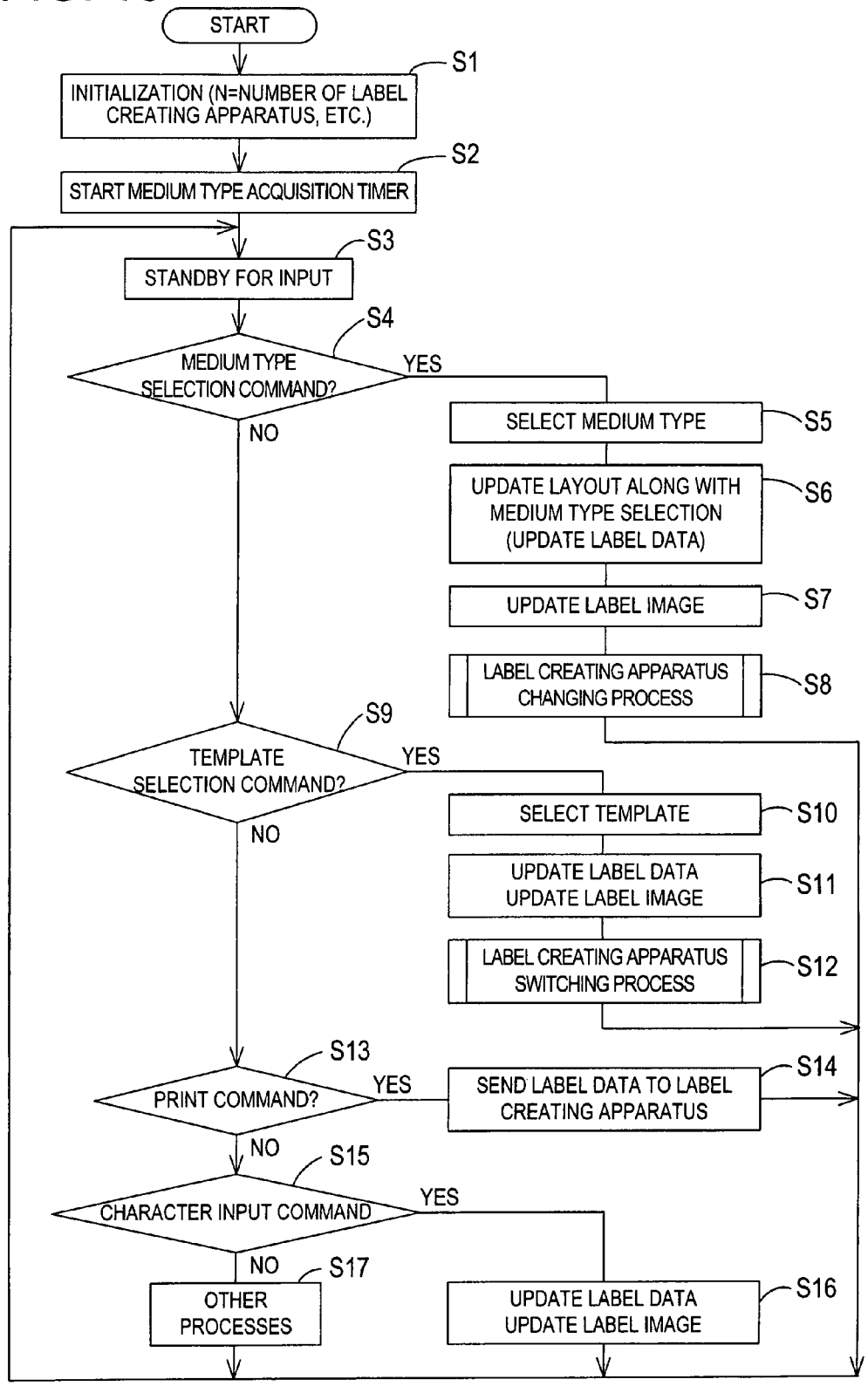
FIG. 15 is a flowchart of a label creating process.
Figure 16:
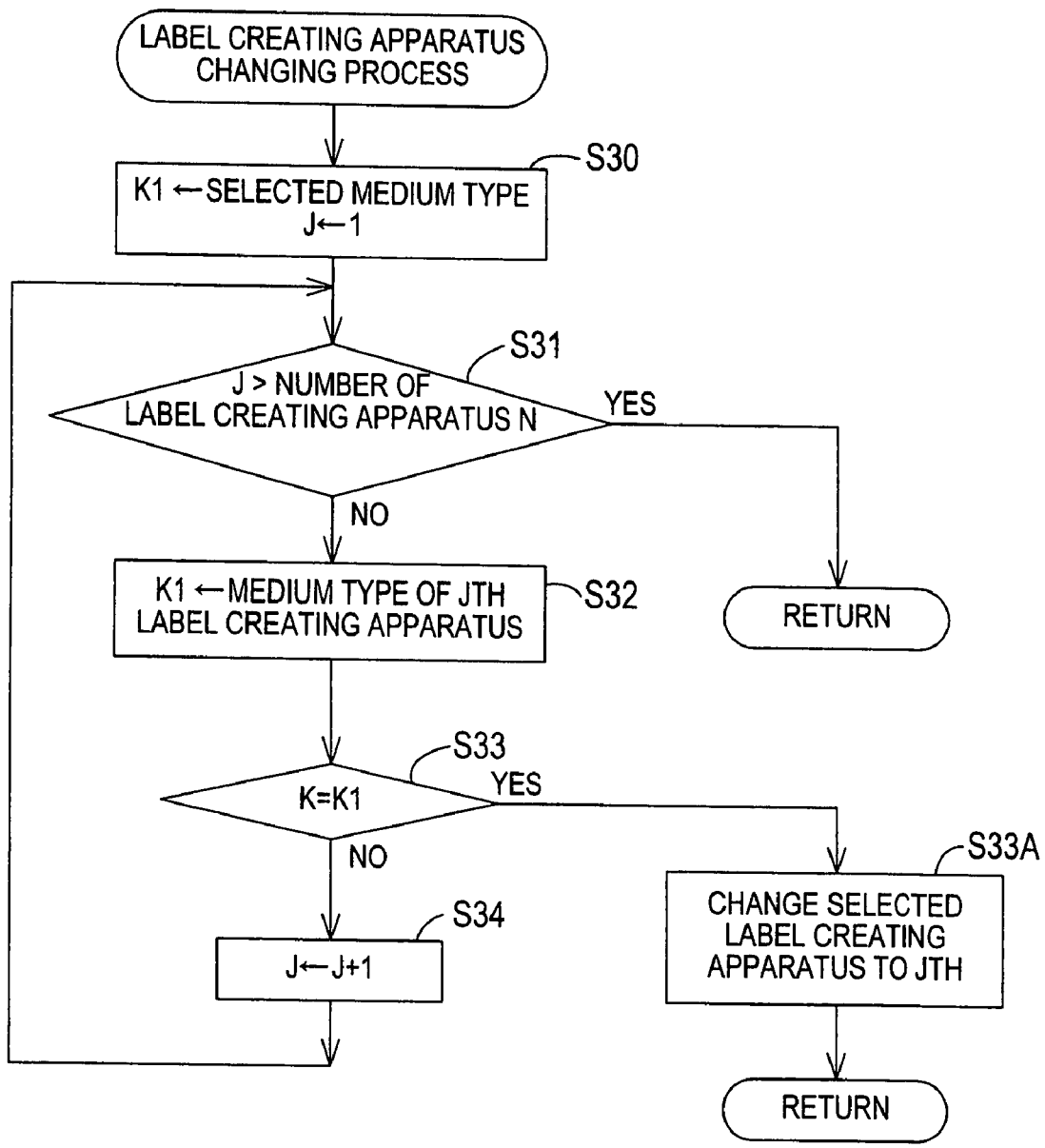
FIG. 16 is a flowchart of a label creating apparatus changing process.
Figure 17:
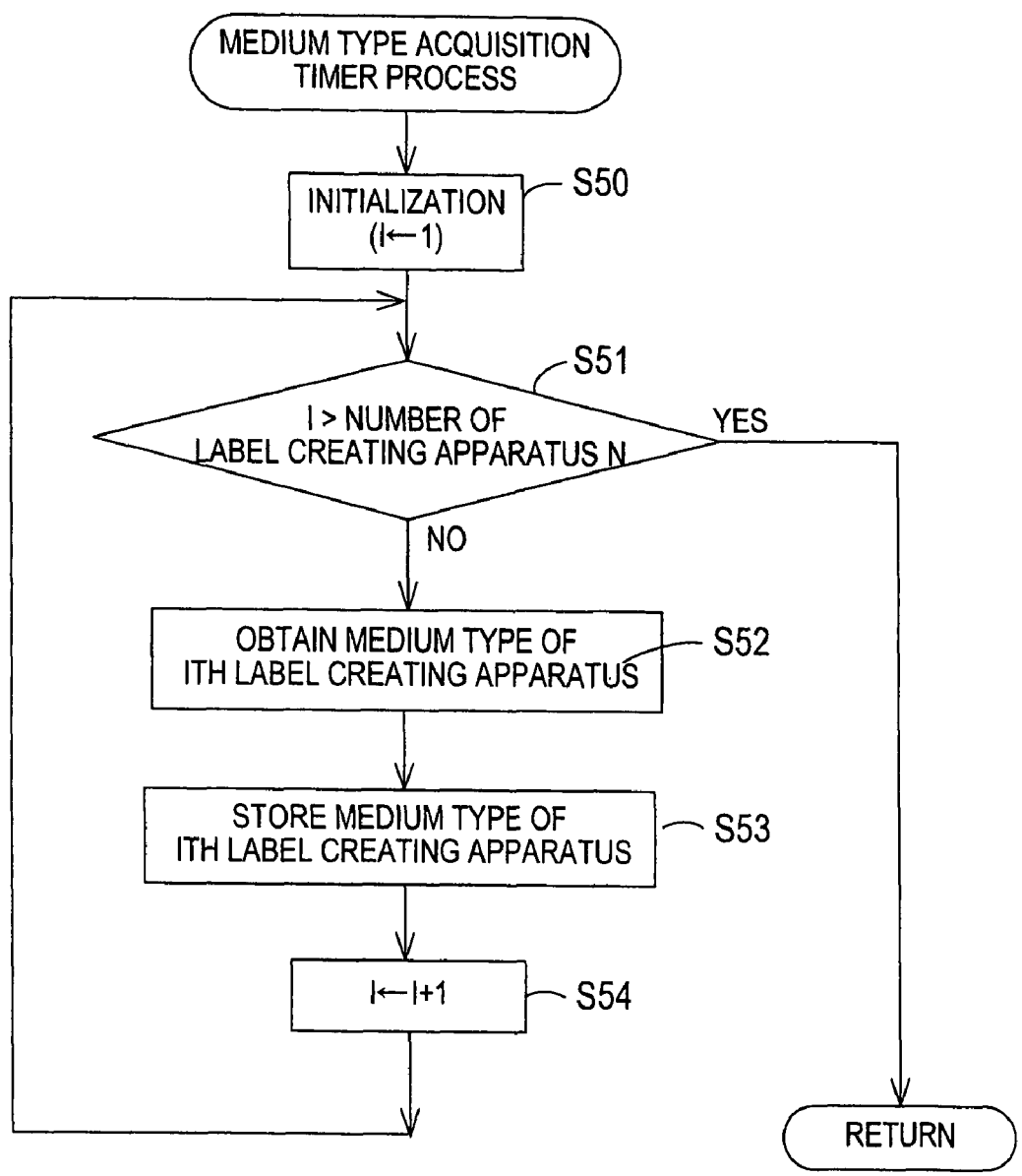
FIG. 17 is a flowchart of a medium type acquisition timer process.

The label creating process performed in the PC 100 will be explained with reference to FIGS. 15 to 17. FIG. 15 is a flowchart of the label creating process. FIG. 16 is a flowchart of the label creating apparatus changing process. FIG. 17 is a flowchart of the medium type acquisition timer process. These processes are performed in the CPU 111 of the PC 100.

Firstly, when the CPU 111 executes the label creating program stored in the label creating program storage area 157, at S1 as shown in FIG. 15, "number of label creating apparatus" is set in a storage area N (not shown) in the work area 152B of the RAM 152. The "number of the label creating apparatus" which is originally stored in an unshown area in the HDD 155 is temporarily copied in the RAM 152 in fact for the label creating process. The "number of the label creating apparatus" is a value which is counted up when each label creating apparatus 1 connected to the network 101 is registered in the PC 100 after the label creating apparatus driver software is installed in the label creating apparatus 1 to be used in the PC 100. The "number of the label creating apparatus" indicates the number of the label creating apparatus 1 which can be used by the PC 100. When the label creating apparatus 1 is registered in the PC 100 as the available apparatus, an "ID" with which the label creating apparatus 1 can be distinguished from other label creating apparatuses is stored in an area (not shown) in the HDD 155 together with a "serial number" showing the registry order.

Every storage areas stored in the apparatus/medium type table storage area 152A of the RAM 152, corresponding to each label creating apparatus, are set power-off.

Storage areas (not shown) in the work area 152 B of the RAM 152 are initialized, and then various initializations such as the display of the edit screen 210 on the monitor 113 by the display control unit 161 are performed. Accordingly, the label creating application 200 has started. After that, the process goes to S2. At S2, counting by the timer 163 counting a predetermined cycle starts to acquire, in the predetermined cycle, the types of the roll sheet holders 3 set in the all label creating apparatuses 1 connected to the network 101 and registered in the PC 100. In this time, as described above, the CPU 111 is arranged to execute the medium type acquisition timer process (see FIG. 17) prior to other processes after each predetermined time that the timer 163 counts has passed. The first acquisition timing, that is, the first medium type acquisition timer process (see FIG. 17) is executed immediately without an interval of the predetermined cycle. After that, the process proceeds to S3. S3 is a standby state for waiting input of the characters, the commands and the like with the keyboard 114 and the mouse 115. When the input is performed, the process goes to S4.

At S4, it is determined whether the medium type selection command is inputted. If it is determined that the medium type selection command is inputted (S4: YES), the flow advances to S5. If it is determined that the medium type selection command is not inputted (S4: NO), the flow advances to S9.

At S5, a medium type selection dialogue (not shown) is displayed on the monitor 113 by means of the display control unit 161. The medium type selection dialogue shows a list of the names of the roll sheet types, and the user can select the roll sheet type therefrom. The selectable roll sheets include the unfixed-length roll sheet 3A of several widths and the die cut label sheet 3B on which the die cut labels 3C are formed in various shapes and sizes. After the user selects the roll sheet type, the flow advances to S6.

At S6, if the label 240 is not displayed in the edit area 220 of the edit screen 210 of the label creating application 200 before the medium type is selected in the medium type selection dialogue (not shown), the printing medium is selected for the first time in the label data create/edit process for the production of the label. In this case, the value of the medium type is newly added to the label data.

On the other hand, if the label 240 is displayed in the edit area 220 of the edit screen 210 of the label creating application 200 before the medium type is selected in the medium type selection dialogue (not shown), the printing medium which has been already entered is modified in the label data create/edit process for the production of the label. In this case, the value of the medium type is updated to the current value. Further, if the object such as the text box and the frame object has been entered and laid out for the unfixed-length roll sheet 3A and the die cut label 3C, the values of the position and the size of the objects stored in the label data is updated according to the predetermined rule. Thus, the objects will be adjusted to be in well-balanced positions on the label when the label is produced based on the label data.

For instance, if the width of the unfixed-length roll sheet 3A is changed, the frame object is modified to the frame along the outline of the unfixed-length roll sheet 3A, keeping the tone of the design. The text box and the illustration object are enlarged or reduced on the same scale as the width of the unfixed-length roll sheet 3A, and then the space between the objects and the unfixed-length roll sheets 3A are modified in the same manner. It is noted that this automatic adjustment feature can be ineffective by the settings. Subsequently, the process goes to S7.

At S7, the label image displayed in the edit area 220 of the edit screen 210 of the label creating application 200 is updated and displayed, according to the label data updated at S6. After that, the process proceeds to S8.

At S8, the label creating apparatus changing process is performed. After that, the flow returns to S3 to repeat the processes at S3 and the followings.

Herein, the explanation of the label creating process referring to FIG. 15 is temporally interrupted, and the explanation of the label creating apparatus changing process will be made with reference to FIG. 16.

At S30 in FIG. 16, the value of the medium type selected by the user at S5 in FIG. 15 is assigned to a storage area K1 (not shown) in the work area 152B of the RAM 152. "1" is set in a storage area J (not shown) in the work area 152B of the RAM 152. After that, the flow advances to S31.

At S31, it is determined whether the value stored in the storage area J (not shown) in the work area 152B of the RAM 152 is larger than the number of the label creating apparatus stored in the storage area N (not shown) in the work area 152B of the RAM 152. If the value stored in the storage area J is larger than the number of the label creating apparatus stored in the storage area N (S31: YES), the medium type corresponding to the medium type stored in the storage area K1 (not shown) in the work area 152B cannot be found in the apparatus/medium type table storage area 152A of the RAM 152. In this case, the monitor 113 displays an error screen (not shown) and a message saying "the available label creating apparatus cannot be found". Additionally, the print menu (not shown) becomes graying out so that the user cannot select it. Further, the error screen is configured to be automatically closed after the predetermined time has passed.

Subsequently, the label creating apparatus changing process ends, and the process goes back to S3 in FIG. 15. If it is determined that the value stored in the storage area J is not larger than the number of the label creating apparatus stored in the storage area N (S31: NO), the process proceeds to S32.

At S32, first of all, one of the storage areas composing the apparatus/medium type table storage area 152A of the RAM 152 is specified according to the value stored in the storage area J (not shown) in the work area 152B of the RAM 152. Next, the value stored in the storage area is stored in a storage area K (not shown) in the work area 152B of the RAM 152. The flow advances to S33.

At S33, it is determined whether the medium type stored in the storage area K (not shown) in the work area 152B of the RAM 152 is same as the medium type stored in the storage area K1 (not shown) in the work area 152B of the RAM 152. If it is determined that the medium type stored in the storage area K is same as the medium type stored in the storage area K1 (S33 YES), the process proceeds to S33A. At S33A, the label creating apparatus 1 corresponding to the value stored in the storage area J (not shown) in the work area 152B of the RAM 152 is set to be the label creating apparatus 1 to which the PC 100 sends the print request. The label creating apparatus changing process ends, and the process returns to S3 in FIG. 15. If it is determined that the medium type stored in the storage area K is not same as the medium type stored in the storage area K1 (S33 NO), the process proceeds to S34.

At S34, "1" is added to the value stored in the storage area J (not shown) in the work area 152B of the RAM 152. After that, the flow returns to S31 to repeat the processes as above.

The followings will explain the label creating apparatus changing process described above, taking FIG. 12 as an example.

At S30, the medium type selected at S5 in FIG. 15, or the medium type selected with the selection of the template at S10 as will be explained later, is stored in the storage area K1 (not shown). If the selected medium type is "18 mm Tape", "18 mm Tape" is stored in the storage area K1. Also, "1" is stored in the storage area J not shown. The flow advances to S31.

At S31, the number of the label creating apparatus has been still stored in the storage area N (not shown) since the number of the label creating apparatus is stored in the storage area N at S1 in FIG. 15. It is assumed that five apparatuses are connected to the network 101, and all of them can be accessed by the PC 100. In this case, "5" is stored in the storage area N (not shown). Herein, at S31, the value "1" of the storage area J (not shown) and the value "5" stored in the storage area N (not shown) are compared to each other. "1" is not larger than "5", so that the outcome of the determination at S31 is NO. The process proceeds to S32.

At this time, "1" is store in the storage area J (not shown). At S32, the value stored in the first storage area is read out, the value being the value of the storage area J out of the storage areas composing the apparatus/medium type table storage area 152A. The value is, in other words, the first medium type in the apparatus/medium type table, which is "6 mm". This "6 mm" is set in the storage area K (not shown) as the value. The flow advances to S33.

At S33, the medium type "18 mm Tape" stored in the storage area K1 (not shown) and the first medium type "6 mm Tape" in the apparatus/medium type table are compared to each other. They are not the same medium types, and thus the outcome of the determination at S33 is NO. The process proceeds to S34.

At S34, "1" is added to the value "1" stored in the storage area J (not shown), so that the value becomes "2". After that, the flow returns to S31.

At S31, the value "2" of the storage area J (not shown) and the value "5" of the storage area N (not shown) are compared to each other. "2" is not larger than "5", so that the outcome of the determination at S31 is NO, and then the process proceeds to S32.

At S32, the value stored in the second storage area is read out, the value being the value of the storage area J out of the storage areas composing the apparatus/medium type table storage area 152A. The value is the second medium type in the apparatus/medium type table, which is "9 mm". This "9 mm" is set in the storage area K (not shown) as the value. The flow advances to S33.

At S33, the medium type "18 mm Tape" stored in the storage area K1 (not shown) and the second medium type "9 mm Tape" in the apparatus/medium type table are compared to each other. They are not the same medium types, and thus the outcome of the determination at S33 is NO. The process proceeds to S34.

At S34, "1" is added to the value "2" stored in the storage area J (not shown), so that the value becomes "3". After that, the flow returns to S31.

At S31, the value "3" of the storage area J (not shown) and the value "5" of the storage area N are compared to each other. "3" is not larger than "5", so that the outcome of the determination at S31 is NO, and then the process proceeds to S32.

At S32, the value stored in the third storage area is read out, the value being the value of the storage area J out of the storage areas composing the apparatus/medium type table storage area 152A. The value is the third medium type in the apparatus/medium type table, which is "Power Off". This "Power Off" is set in the storage area K (not shown) as the value. The flow advances to S33.

At S33, the medium type "18 mm Tape" stored in the storage area K1 (not shown) and the third medium type "Power Off" in the apparatus/medium type table are compared to each other. They are not the same medium types, and thus the outcome of the determination at S33 is NO. The process proceeds to S34.

At S34, "1" is added to the value "3" stored in the storage area J (not shown), so that the value becomes "4". After that, the flow returns to S31.

At S31, the value "4" of the storage area J (not shown) and the value "5" of the storage area N (not shown) are compared to each other. "4" is not larger than "5", so that the outcome of the determination at S31 is NO, and then the process proceeds to S32.

At S32, the value stored in the fourth storage area is read out, the value being the value of the storage area J out of the storage areas composing the apparatus/medium type table storage area 152A. The value is the fourth medium type in the apparatus/medium type table, which is "18 mm". This "18 mm" is set in the storage area K (not shown) as the value. The flow advances to S33.

At S33, the medium type "18 mm Tape" stored in the storage area K1 (not shown) and the fourth medium type "18 mm Tape" in the apparatus/medium type table are compared to each other. They are the same medium types, and thus the outcome of the determination at S33 is YES. The label creating apparatus 1 corresponding to the fourth one stored in the storage area J (not shown) is set to be the label creating apparatus 1 to which the PC 100 sends the print request. Finally, the label creating apparatus changing process ends.

Herein, the explanation will return to the label creating process again with reference to FIG. 15.

At S9, it is determined whether the entry at S3 is the template selection command. If it is determined that the entry is the template selection command (S9: YES), the process goes to S10. If it is determined that the entry is not the template selection command (S9: NO), the flow advances to S13.

At S10, the template selection dialogue 300 as explained with reference to FIG. 14 is displayed on the monitor 113 by means of the display control unit 161. The user selects the desired category from the category select field 310 with the keyboard 114 and the mouse 115. When the user selects the category, the list of the templates displayed in the style select field 320 changes in accordance with the selected category. The user selects the desired template therefrom with the keyboard 114 and the mouse 115 again. The template selection is accepted with the click of the OK button in the bottom of the template select dialogue 300. After that, the process goes to S11.

At S11, the label data for the production of the label is updated in accordance with the template of the selected layout template. When the label data is updated, all objects which has been already entered are deleted, out of the objects included in the label data to be printed. Instead, the object included in the template selected at S10 is added to the label data. Further, regarding to the value of the printing medium included in the label data, if the value of the printing medium has been already entered, the data is deleted. Instead, the value of the printing medium included in the template selected at S10 is added to the label data. As just described, the label image which was displayed in the edit area 220 of the edit screen 210 of the label creating application 200 is updated to be displayed. After that, the process goes to S12.

At S12, the label creating apparatus changing process as described above with reference to FIG. 16 is executed. Next, the flow returns to S3 to repeat the processes at S3 and the followings.

At S13, it is determined whether the entry is the print command. If it is determined that the entry is the print command (S13: YES), the flow advances to S14. If it is determined that the entry is not the print command (S13: NO), the process proceeds to S15.

Next, the explanation of S14 will be made. In the label creating apparatus changing process (see FIG. 16) as described above, the label crating apparatus 1 to which the print request is sent is specified. At S14, the print request including the label data which is being created/edited in the edit area 220 of the edit screen 210 of the label creating application 200 is sent to the specified label creating apparatus 1. If the label creating apparatus 1 to which the print request is to be sent is not set, the print menu (not shown) is graying out, so that the print command cannot be issued from the label creating application 200. After that, the flow goes to S15.

At S15, it is determined whether the entry is the character input command with the various character keys on the keyboard 114. If it is determined that the entry is the character input command (S15: YES), the flow advances to S16. If it is determined that the entry is not the character input command (S15: NO), the process proceeds to S17.

At S16, the CPU 111 updates the label data by the addition/insertion of the characters to the text object data composing the label data, according to the character input command. In accordance with the label data updated in this manner, the label image which was displayed in the edit area 220 of the edit screen 210 of the label creating application 200 is updated to be displayed. After that, the process returns to S3.

At S17, other processes are performed. The processes include the entry of symbols and illustrations, the delete of the characters, various character decorations and the commands in the menu other than those above. After that, the process returns to S3.

Next, the medium type acquisition timer process will be explained with reference to FIG. 17. This process is the so-called interrupt process. The CPU 111 is arranged to execute the medium type acquisition timer process prior to other processes after each predetermined time that the timer 163 counts has passed. However, the medium type acquisition timer process is set not to be executed on a priority basis during the sending/receiving process to/from the label creating apparatus 1 (for instance, at S14 in FIG. 15) in the label creating process (see FIG. 15) mentioned above, and the label creating apparatus changing process (see FIG. 16).

At S50 in FIG. 17, "1" is set in a storage area I (not shown) in the work area 152B of the RAM 152. After that, the flow advances to S51.

At S51, it is determined whether the value stored in the storage area I (not shown) in the work area 152B of the RAM 152 is larger than the number of the label creating apparatus stored in the storage area N (not shown) in the work area 152B of the RAM 152. If the value stored in the storage area I is larger than the number of the label creating apparatus stored in the storage area N (S51:YES), the medium type acquisition timer process is terminated. The flow goes back to the previous process before the interruption to repeat the following processes.

At S52, first of all, the value stored in the storage area I (not shown) in the work area 152B of the RAM 152 is specified to be a registration order of the label creation being available in the PC 100. The sheet type request is sent to the label creating apparatus 1 corresponding to the order, by means of the communication I/F 160. Herein, the sheet type request is the request for the data about the medium type of the printing medium set in the label creating apparatus 1. The data about the roll sheet holder 3 which is sent back from the label creating apparatus 1 as requested is transformed to the format available in the PC 100 by selection and is obtained as the information about the medium type. It is noted that if there is no response from the label creating apparatus 1 within the predetermined time after the sheet type request is sent, it is determined that the label creating apparatus 1 is OFF. After that, the process proceeds to S53.

At S53, the data about the medium type acquired at S52 is stored in the apparatus/medium type table storage area 152A, according to the value stored in the storage area I (not shown) in the work area 152B of the RAM 152. If it is determined that the label creating apparatus 1 is OFF, "Power Off" is stored instead of the data about the medium type. After that, the flow advances to S54.

At S54, "1" is added to the value stored in the storage area I (not shown) in the work area 152B of the RAM 152. The process returns to S51 to repeat the processes at S51 and the followings.

The followings will explain the medium type acquisition timer process described above, taking FIG. 12 as an example.

At S50, "1" is set in the storage area I (not shown). The flow advances to S51.

At S51, the number of the label creating apparatus has been still stored in the storage area N (not shown) since the number of the label creating apparatus is stored in the storage area N at S1 in FIG. 15. It is assumed that five apparatuses are connected to the network 101, and all of them can be accessed by the PC 100. In this case, "5" is stored in the storage area N (not shown). Herein, at S51, the value "1" of the storage area I (not shown) and the value "5" stored in the storage area N (not shown) are compared to each other. "1" is not larger than "5", so that the outcome of the determination at S51 is NO. The process proceeds to S52.

At S52, the value "1" stored in the storage area I (not shown) is specified to be a registration order of the label creation being available in the PC 100. The sheet type request is sent to the first label creating apparatus 1 corresponding to the order. Herein, the data "Type: Unfixed-length Roll Sheet 3A, Material of Thermal Sheet: Material A, Roll sheet Width: 6 mm" is sent back from the first label creating apparatus 1, as the data about the roll sheet holder 3. The data is transformed to the format available in the PC 100 by selection, thereby being obtained as the medium type "6 mm Tape". After that, the process proceeds to S53.

At S53, the data as the medium type "6 mm Tape" acquired at S52 is stored in the first of the apparatus/medium type table storage area 152A, according to the value "1" stored in the storage area I (not shown). After that, the flow advances to S54.

At S54, "1" is added to the value "1" stored in the storage area I (not shown), so that the value becomes "2". The process returns to S51.

At S51, the value "2" stored in the storage area I (not shown) and the value "5" stored in the storage area N (not shown) are compared to each other. "2" is not larger than "5", so that the outcome of the determination at S51 is NO. The process proceeds to S52.

At S52, the value "2" stored in the storage area I (not shown) is specified to be a registration order of the label creation being available in the PC 100. The sheet type request is sent to the second label creating apparatus 1 corresponding to the order. Herein, the data "Type: Unfixed-length roll sheet 3A, Material of Thermal Sheet: Material A, Roll Sheet Width: 9 mm" is sent back from the second label creating apparatus 1, as the data about the roll sheet holder 3. The data is transformed to the format available in the PC 100 by selection, thereby being obtained as the medium type "9 mm Tape". After that, the process proceeds to S53.

At S53, the data as the medium type "9 mm Tape" acquired at S52 is stored in the second of the apparatus/medium type table storage area 152A, according to the value "2" stored in the storage area I (not shown). After that, the flow advances to S54.

At S54, "2" is added to the value "1" stored in the storage area I (not shown), so that the value becomes "3". The process returns to S51.

At S51, the value "3" stored in the storage area I (not shown) and the value "5" stored in the storage area N (not shown) are compared to each other. "3" is not larger than "5", so that the outcome of the determination at S51 is NO. The process proceeds to S52.

At S52, the value "3" stored in the storage area I (not shown) is specified to be a registration order of the label creation being available in the PC 100. The sheet type request is sent to the third label creating apparatus 1 corresponding to the order. Herein, there is no response within the predetermined time from the third label creating apparatus 1. Therefore, it is determined that the third label creating apparatus 1 is OFF. The process proceeds to S53.

At S53, the data as "Power Off" is stored in the third of the apparatus/medium type table storage area 152A, according to the value "3" stored in the storage area I (not shown). After that, the flow advances to S54.

At S54, "3" is added to the value "1" stored in the storage area I (not shown), so that the value becomes "4". The process returns to S51.

At S51, the value "4" stored in the storage area I (not shown) and the value "5" stored in the storage area N (not shown) are compared to each other. "4" is not larger than "5", so that the outcome of the determination at S51 is NO. The process proceeds to S52.

At S52, the value "4" stored in the storage area I (not shown) is specified to be a registration order of the label creation being available in the PC 100. The sheet type request is sent to the fourth label creating apparatus 1 corresponding to the order. Herein, the data "Type: Unfixed-length Roll sheet 3A, Material of Thermal Sheet: Material A, Roll Sheet Width: 18 mm" is sent back from the fourth label creating apparatus 1, as the data about the roll sheet holder 3. The data is transformed to the format available in the PC 100 by selection, thereby being obtained as the medium type "18 mm Tape". After that, the process proceeds to S53.

At S53, the data as the medium type "18 mm Tape" acquired at S52 is stored in the fourth of the apparatus/medium type table storage area 152A, according to the value "4" stored in the storage area I (not shown). After that, the flow advances to S54.

At S54, "4" is added to the value "1" stored in the storage area I (not shown), so that the value becomes "5". The process returns to S51.

At S51, the value "5" stored in the storage area I (not shown) and the value "5" stored in the storage area N (not shown) are compared to each other. "5" is not larger than "5", so that the outcome of the determination at S51 is NO. The process proceeds to S52.

At S52, the value "5" stored in the storage area I (not shown) is specified to be a registration order of the label creation being available in the PC 100. The sheet type request is sent to the fifth label creating apparatus 1 corresponding to the order. Herein, the data "Type: Die Cut Label Sheet 3B, Material of Thermal Sheet: Material A, Roll Sheet Width: 35 mm, Die Cut Type: Square 29 mm×90 mm" is sent back from the fifth label creating apparatus 1, as the data about the roll sheet holder 3. The data is transformed to the format available in the PC 100 by selection, thereby being obtained as the medium type "29 mm×90 mm Die Cut Tape". After that, the process proceeds to S53.

At S53, the data as the medium type "29 mm×90 mm die cut tape" acquired at S52 is stored in the fifth of the apparatus/medium type table storage area 152A, according to the value "5" stored in the storage area I (not shown). After that, the flow advances to S54.

At S54, "5" is added to the value "1" stored in the storage area I (not shown), so that the value becomes "6". The process returns to S51.

At S51, the value "6" stored in the storage area I (not shown) and the value "5" stored in the storage area N (not shown) are compared to each other. "6" is larger than "5", so that the outcome of the determination at S51 is YES. The medium type acquisition timer process ends.

In the label creating system 50 of this exemplary embodiment, the label creating apparatus 1 comprises the sheet discrimination sensors SS1, SS2, SS3, SS4, and SS5 to read out the medium type from the sheet discrimination part 60 which is provided in the roll sheet holder 3 to indicate the roll sheet type. The PC 100 comprises the CPU 111 which determines the label creating apparatus 1 to which the label data is sent based on the medium type obtained from the label creating apparatus 1 by means of the communication I/F 160. The sheet discrimination sensors SS1, SS2, SS3, SS4, and SS5 are arranged to read out the medium type from the sheet discrimination part 60 of the roll sheet holder 3 which is set in the label creating apparatus 1 when the label creating program starts in the PC 100.

Accordingly, the PC 100 can determine the label creating apparatus 1 corresponding to the label data according to the medium type obtained from the label creating apparatus 1 before creating the label data. Also, the PC 100 can instruct this label creating apparatus 1 to produce the label. Therefore, the user does not have to select the label creating apparatus 1 in each label printing, which improves the usability.

Further, in the label creating system 50 of this exemplary embodiment, the PC 100 is configured to send the sheet type request to the label creating apparatus 1 by means of the communication I/F 68 in each predetermined time.

Accordingly, if the predetermined time is set short, the label creating apparatus 1 to which the label data is sent can be selected even when the roll sheet holder 3 is changed in the label creating apparatus 1. Therefore, the usability is developed further for the user.

Additionally, in the label creating system 50 of this exemplary embodiment, the medium type is configured to include any one of the sheet widths of the unfixed-length roll sheet 3A and the types of the die cut label sheet 3B to be held in the roll sheet holder 3.

Accordingly, the user can select the label creating apparatus 1 according to the sheet width of the unfixed-length roll sheet 3A and the type of the die cut label sheet 3B to be held in the roll sheet holder 3. Therefore, the usability is developed further for the user.

The disclosure may be embodied in other specific forms without departing from the essential characteristics thereof.

A film tape can be stored in a tape cassette as the printing medium, instead of the roll sheet as the printing medium to be held in the roll sheet holder 3.

A plurality of label creating apparatuses 1 is connected to the PC via the network 101. But they can be connected to the PC 100 directly not through the network 101.

While the presently exemplary embodiment has been shown and described, it is to be understood that this disclosure is for the purpose of illustration and that various changes and modifications may be made without departing from the scope of the disclosure as set forth in the appended claims.

What is claimed is:

1. A label creating system comprising:
   a terminal device; and
   a plurality of label creating apparatuses that can be connected to the terminal device and can removably accommodate a cartridge holding a tape-typed printing medium,
   wherein the terminal device comprises:
      a storage device that stores a label data creating and editing program;
      a label data creating apparatus that creates label data in accordance with execution of the label data creating and editing program;
      a data requesting device that can request data on a medium type of the printing medium to each of the label creating apparatuses to be connected when the label data creating and editing program starts and can continuously request data in a predetermined interval of time while the label data creating and editing program is running;
      a first receiving device that can receive the data on the medium type sent from each of the label creating apparatuses in response to the request from the data requesting device,
      a determination device that can determine one of the label creating apparatuses to which the label data can be sent on the basis of the data on the medium type received from the first receiving device; and
      a first sending device that can send the label data to one of the label creating apparatuses which is determined by the determination device, and each of the label creating apparatuses comprises:
      a discrimination sensor that can discriminate the medium type of the printing medium to be held in the cartridge;
      a second sending device that can send the data on the medium type discriminated by the discrimination sensor in response to the request from the terminal device;

a second receiving device that can receive the label data sent from the terminal device; and a label printing apparatus that prints on the printing medium on the basis of the label data received by the second receiving device, wherein the discrimination sensor comprises one or more switches disposed on the label printing apparatus; and the one or more switches being selectively engaged by the cartridge for holding the printing medium;

whereby the terminal device automatically discriminates one or more of:

a material type of the printing medium;

a width of the printing medium;

whether the printing medium is an unfixed length roll sheet or a die cut sheet; and a pitch size of encoder marks disposed on the printing medium.

2. The label creating system according to claim 1, wherein the data on the medium type includes the data on a width of the printing medium to be held in the cartridge.

3. The label creating system according to claim 1, wherein the printing medium is a die cut label sheet made of a print base sheet, an adhesive layer on one side of the print base sheet and a release sheet adhered to the adhesive layer, and is provided with a half cut to form a predetermined shape and to cut only the print base sheet of the printing medium, and the data on the medium type includes the data on a die cut label sheet type.

4. The label creating system of claim 1, wherein said one or more switches are plural mechanical switches.

5. The label creating system of claim 4, wherein said mechanical switches comprise plungers recessed within said label printing apparatus.

* * * * *